US012644233B2

(12) United States Patent
Brockman et al.

(10) Patent No.: US 12,644,233 B2
(45) Date of Patent: Jun. 2, 2026

(54) TRANSPORT VEHICLE POSITIONING FOR PAVING TRAIN MACHINES

(71) Applicant: Caterpillar Paving Products Inc., Brooklyn Park, MN (US)

(72) Inventors: Elizabeth R.K. Brockman, Charlotte, NC (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 790 days.

(21) Appl. No.: 17/951,660

(22) Filed: Sep. 23, 2022

(65) Prior Publication Data
US 2024/0102254 A1 Mar. 28, 2024

(51) Int. Cl.
*E01C 19/00* (2006.01)
*B60Q 1/50* (2006.01)
*G05D 1/00* (2024.01)

(52) U.S. Cl.
CPC ............ *E01C 19/004* (2013.01); *B60Q 1/508* (2022.05); *G05D 1/0044* (2013.01); *G05D 1/0061* (2013.01); *B60Q 2400/50* (2013.01)

(58) Field of Classification Search
CPC ....... E01C 19/004; E01C 19/48; B60Q 1/508; B60Q 2400/50; G05D 1/0044; G05D 1/0061; G05D 1/692; G05D 1/697; G05D 1/225; G05D 2105/05; G05D 2107/90; G05D 2109/10
See application file for complete search history.

(56) References Cited

U.S. PATENT DOCUMENTS

| | | | |
|---|---|---|---|
| 9,957,675 B2 | 5/2018 | Marsolek et al. | |
| 10,024,708 B2 | 7/2018 | Marsolek et al. | |
| RE48,393 E | 1/2021 | Marsolek | |
| 10,885,490 B2 | 1/2021 | Mains, Jr. et al. | |
| 10,894,561 B2 | 1/2021 | Kaufmann et al. | |
| 10,968,602 B2 | 4/2021 | Hendricks | |
| 11,232,712 B2 | 1/2022 | Mcalpine et al. | |
| 11,240,961 B2 | 2/2022 | Anderson et al. | |
| 2010/0215433 A1* | 8/2010 | Fritz .................... | G05D 1/0236 404/84.5 |

(Continued)

FOREIGN PATENT DOCUMENTS

WO 2021071775 A1 4/2021

*Primary Examiner* — Rodney A Butler

(57) ABSTRACT

A method for directing transport vehicles based on real-time operating parameters of a paving train machine comprises estimating a material productivity value at a current location of the paving train machine, comparing the material productivity value to a threshold productivity value, generating a predicted location for the paving train machine when the threshold will be reached, and communicating the generated predicted location to a transport vehicle. A system for coordinating location of an empty transport vehicle in a paving train comprises a sensor to generate material productivity data for a paving train machine, a controller configured to determine an output rate of the paving train machine, a time when an in-use transport vehicle will be at capacity, and a location for where the in-use transport vehicle will be at capacity, and a communication device for the paving train machine configured to transmit the location to the empty transport vehicle.

16 Claims, 8 Drawing Sheets

(56)         References Cited

U.S. PATENT DOCUMENTS

| | | | |
|---|---|---|---|
| 2013/0290062 A1* | 10/2013 | Patel ................ | G06Q 10/06313 |
| | | | 705/7.23 |
| 2017/0167089 A1* | 6/2017 | Marsolek .............. | E01C 23/088 |
| 2020/0219400 A1 | 7/2020 | Mcalpine et al. | |
| 2020/0256021 A1 | 8/2020 | Mcalpine et al. | |
| 2021/0118066 A1 | 4/2021 | Walker et al. | |
| 2021/0302979 A1 | 9/2021 | McAlpine et al. | |

* cited by examiner

TRANSPORT VEHICLE POSITIONING FOR PAVING TRAIN MACHINES

TECHNICAL FIELD

The present application relates generally, but not by way of limitation, to paving trains comprising milling machines, paving machines and transport vehicles. More particularly, the present application relates to systems and methods for coordinating operations between milling machines, paving machines and transport vehicles.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to adequately support wheel loads. In order to rehabilitate the roadways for continued vehicular use, spent asphalt is removed in preparation for resurfacing.

Milling machines, such as cold planers and rotary mixers, are used to break up and remove layers of an asphalt roadway during a resurfacing operation. A milling machine typically includes a frame propelled by tracked or wheeled drive units. The frame supports an engine, an operator station, a milling drum, and conveyors. The milling drum, fitted with cutting bits, is rotated through a suitable interface with the engine to break up the surface of the roadway. The broken-up roadway material is deposited by the milling drum onto the conveyors, which transfer the broken-up material into transport vehicles for removal from the worksite to a dump site. A paving machine follows behind the milling machine at a desired distance and covers the milled surface with fresh asphalt. Transport vehicles carrying fresh, hot asphalt from an asphalt plant periodically pass between the paving machine and the milling machine to deliver additional asphalt to the paving machine. This process repeats until the resurfacing operation is finished.

Transport vehicles are utilized according to a job plan wherein the number of transport vehicles, associated routes for the transport vehicles and spacing intervals between transport vehicles are estimated a priori based on a route of the paving train. However, after a number of trips by the transport vehicles between either the dump site or the asphalt plant, the spacing intervals can become disrupted. For example, sometimes the milling machine stops to change out cutting bits, thereby also requiring the paving machine to slow down or stop.

U.S. Pat. No. RE48,393 E to Marsolek is titled "System for Coordinating Milling and Paving Machines." U.S. RE48,393 discloses a system comprising a first sensor configured to generate a first signal indicative of a position of the cold planer, a production monitoring system associated with the cold planer and configured to determine a milling rate of the cold planer, a communication device configured to exchange information between the cold planer and the paver, and a controller.

U.S. Pat. No. 9,957,675 to Marsolek et al. is titled "Cold Planer Loading and Transport Control System." U.S. Pat. No. 9,957,675 discloses a control system for a cold planer having a conveyor configured to transfer material into a first receptacle is disclosed. The control system may include a first sensor configured to generate a first signal indicative of an amount of material being transferred into the first receptacle, a communication device configured to transfer information between the cold planer and the first receptacle, and a controller electronically connected to the first sensor and the communication device.

SUMMARY OF THE INVENTION

A method for directing a transport vehicle based on real-time operating parameters of a paving train machine in a paving train comprises estimating a material productivity value at a current location of the paving train machine, comparing the material productivity value to a threshold productivity value, generating a predicted location for the paving train machine when the threshold productivity value will be reached, and communicating the predicted location that is generated to the transport vehicle.

A system for coordinating location of an empty transport vehicle in a paving train operation comprises a sensor configured to generate material productivity data for a paving train machine, a controller for the paving train machine, the controller being configured to determine an output rate of the paving train machine from the material productivity data, a time when an in-use transport vehicle will be at capacity based on the output rate, and a location for where the in-use transport vehicle will be at capacity based on the time, and a communication device for the paving train machine configured to transmit the location to the empty transport vehicle.

DETAILED DESCRIPTION

For the purpose of this disclosure, the term "asphalt" is defined as a mixture of aggregate and asphalt cement. Asphalt cement is a brownish-black solid or semi-solid mixture of bitumens obtained as a byproduct of petroleum distillation. The asphalt cement can be heated and mixed with the aggregate for use in paving roadway surfaces, where the mixture hardens upon cooling. A cold planer comprises a machine used to remove layers of hardened asphalt from an existing roadway. A rotary mixer comprises a machine that can breakup layers of hardened asphalt and mix in an additive, such as a binder, and then leave the mixture of broken asphalt in place for subsequent processing by other equipment, such as motor graders and soil compactors. Where rotary mixers are used, the transport vehicle may be an emulsion truck supplying additives (e.g., binders). Cold planers and rotary mixers can each be described as a milling machine. Furthermore, it is contemplated that the disclosed milling machines can also or alternatively be used to remove cement and other roadway surfaces, or to remove non-roadway surface material such as in a mining operation. The present disclosure is applicable to various paving train machines including rotary mixers, cold planers and paving machines and is particularly applicable to cold planers.

Figure 1:
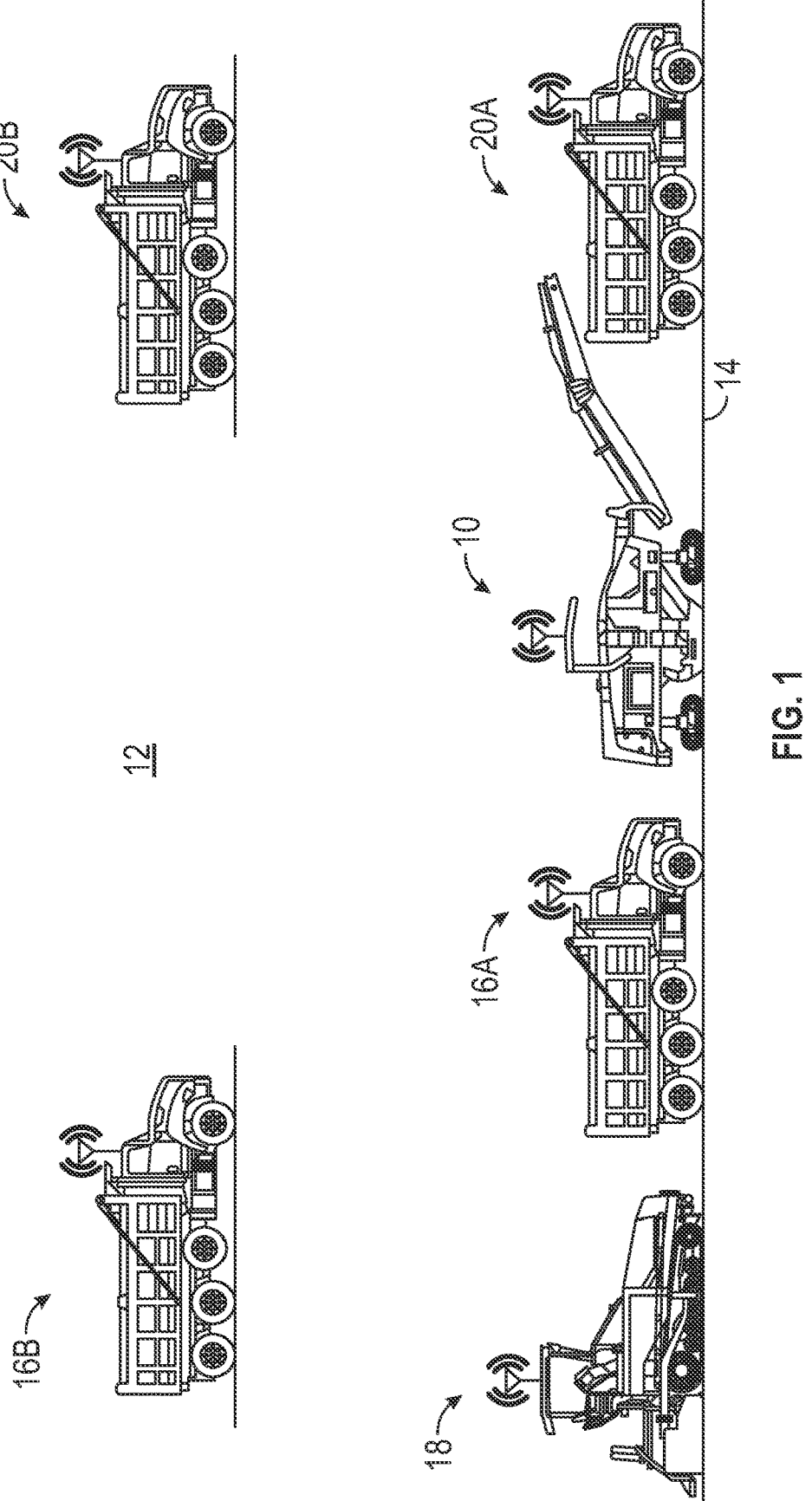
FIG. 1 is a pictorial illustration of an exemplary jobsite of a resurfacing operation comprising a paving train including a milling machine, a paving machine and a plurality of transport vehicles.

FIG. 1 shows cold planer 10 employed at worksite 12, such as, for example, a roadway resurfacing operation. As part of the resurfacing operation, cold planer 10 can mill a surface 14 of the roadway and transfer milled material into first transport vehicle 20A. When full, transport vehicle 20A can depart from cold planer 10 to deliver the milled material to a dump site (not shown), and empty transport vehicle 20B can approach cold planer 10 to replace full transport vehicle 20A to allow for a continuous milling process. Where rotary mixers are used, the transport vehicle 20A can comprise a truck being emptied of emulsion additives (e.g., binders) and transport vehicle 20B can comprise a truck full of emulsion additives. Additional transport vehicles similar to transport vehicles 20A and 20B with empty cargo containers, e.g., dump boxes, can be summoned from the storage site, a dispatch facility or elsewhere when it is determined that additional hauling capacity is needed. In examples, three, four, five or more transport vehicles can be used with cold planer 10.

Paver 18 can comprise a paving machine that can follow behind cold planer 10 and deposit a layer of paving material, such as fresh asphalt, onto surface 14 after it has been milled by cold planer 10. Transport vehicle 16A can be positioned between paver 18 and cold planer 10 to deliver fresh asphalt to paver 18 to allow for a continuous paving process. Additional transport vehicles, such as transport vehicle 16B, similar to transport vehicle 16A containing fresh asphalt can be summoned from an asphalt plant (not shown) or dispatch facility when it is determined that additional asphalt is needed. In examples, three, four, five or more transport vehicles can be used with paver 18.

As is described herein, empty transport vehicle 20B, as well as full transport vehicles 16B for paver 18, are routed to cold planer 10 and paver 18, respectively, at intervals to keep the paving operation operating. It is desirable for the transport vehicles to be at cold planer 10 or paver 18 when needed in order to avoid stoppage of the paving operation. It is also desirable to minimize the number of transport vehicles being used to reduce cost, avoid worksite congestion and reduce the number of idling vehicles. Typically, coordination of transport vehicles is conducted manually based on a job plan, milling plan or paving plan produced ahead of the actual paving operation. For example, it can be estimated how many transport vehicles are needed based on the job size and distances from the dump site and asphalt plant to locations along the work site can be estimated, as well as other known locations and distances such as the distances between and to multiple dump sites and asphalt plants. Thereafter, the transport vehicles can operate at intervals based on the pace of the paving operation. Typically, a transport vehicle loaded with fresh asphalt and a transport vehicle with an empty container wait ahead of their respective machine until needed, manually adjusting their positions based on a visual assessment of the paver or cold planer. However, such practice requires the transport vehicle drivers to be constantly monitoring the paving train operation and moving accordingly. Furthermore, such practice often results in transport vehicle congestion or traffic jams due to variabilities in the paving operation. For example, the paving train may encounter obstacles, such as manhole covers, that slow down the paving train operation. In another example, cutting bits or water tanks may need to be serviced more often than initially planned due to different or varying asphalt or weather conditions. As such, transport vehicle may not be aware of such delays and can arrive back at the paving train operation earlier than desired or needed.

The present disclosure provides systems and methods for positioning transport vehicles at locations along the paving operation route based on real-time feedback from the paving train. Transport vehicle can be routed via predictive positioning information generated according to the present disclosure automatically, such as via autonomous operation, or manually, such as by a driver seated in the transport vehicle. Transport vehicles can be directed to specific geographic locations, such as via a map, driving directions, geolocations or geographic coordinates, to wait for the paving train at the exact or near exact position the transport vehicle is needed. The specific geographic location can be determined based on productivity outputs of the paving train, such as outputs from various productivity sensors for paving train machines such as milling machines and paving machines. The specific geographic location can be updated in real-time to account for variances in the paving operation, such as those that deviate from an initial job plan. Furthermore, the specific geographic location can be adjusted based on the actual relative position between the transport vehicle and its respective paving train machine as the two machines prepare for engagement using, for example, visual locating instructions. For example, the paver or cold planer can provide visual instructions for the driver of the transport vehicle to follow, thereby supplementing or supplanting the previous specific geographic location instruction. Further examples can include updating the specific geographic locations for instances when transport vehicles depart their corresponding work machine before an estimated departure time, such as when a full transport vehicle departs a milling machine before being loaded to 100% capacity.

Figure 2:
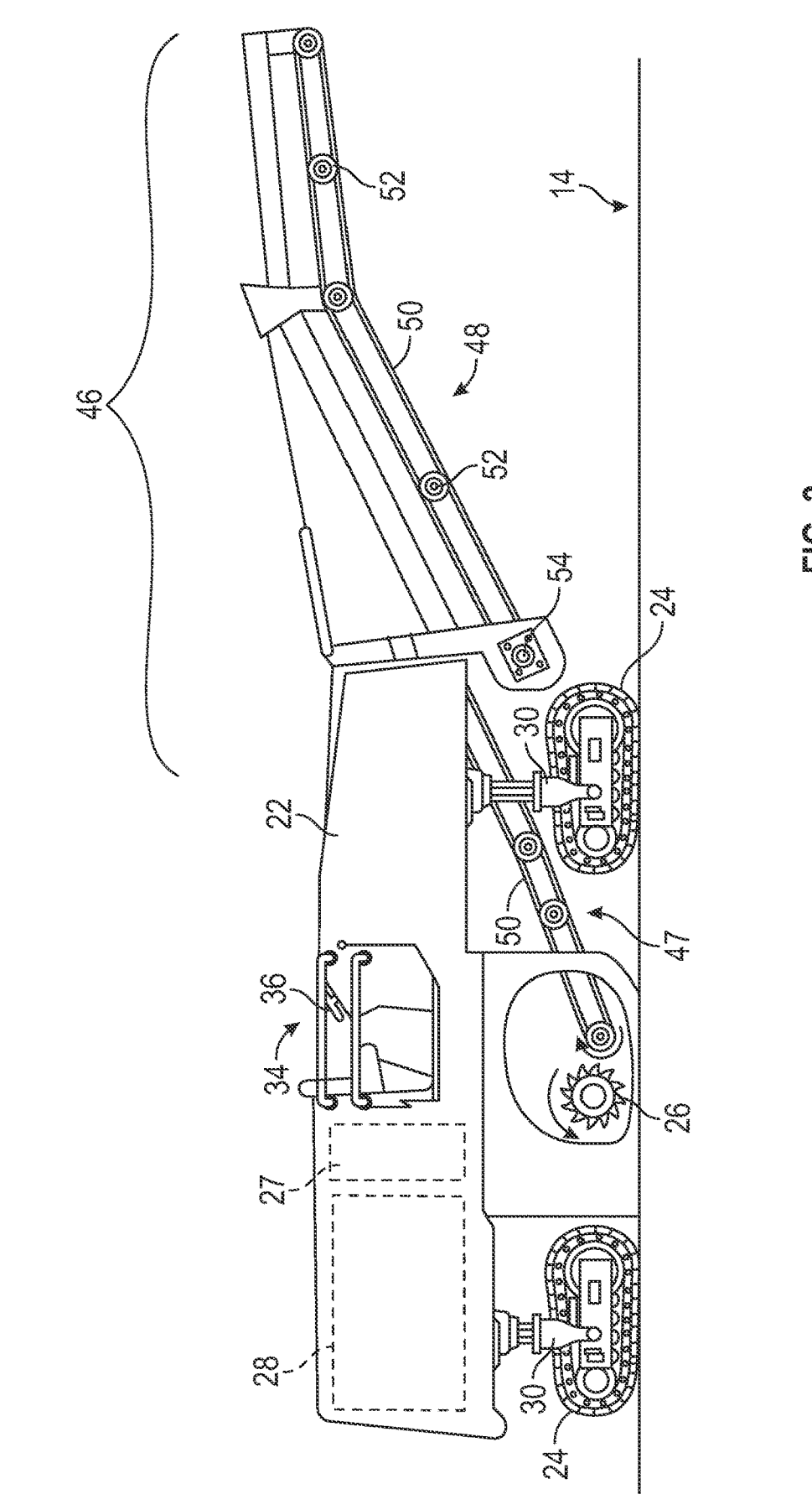
FIG. 2 is a schematic illustration of the milling machine of FIG. 1.

FIG. 2 illustrates exemplary cold planer 10 having frame 22 supported by one or more traction devices 24, milling drum 26 rotationally supported beneath an underside of frame 22, water tank 27, and engine 28 mounted to frame 22. Engine 28 can be configured to drive milling drum 26 and traction devices 24. Traction devices 24 can include either wheels or tracks connected to actuators 30, such as hydraulic cylinders, that are adapted to controllably raise and lower frame 22 relative to surface 14. It should be noted that, in the disclosed embodiment, raising and lowering of frame 22 can also function to vary a milling depth of milling drum 26 into surface 14. In some embodiments, the same or different actuators 30 can also be used to steer cold planer 10 and or to adjust a travel speed of traction devices 24 (e.g., to speed up or brake traction devices 24), if desired. Cold planer 10 can comprise conveyor system 46 comprising first conveyor 47 and second conveyor 48. Second conveyor 48 can be pivotally connected at a leading end to frame 22 and configured to transport material away from milling drum 26 and into a receptacle, such as a transport vehicle 20A (referring to FIG. 1). Other types of receptacles can be used, if desired.

Figure 3:
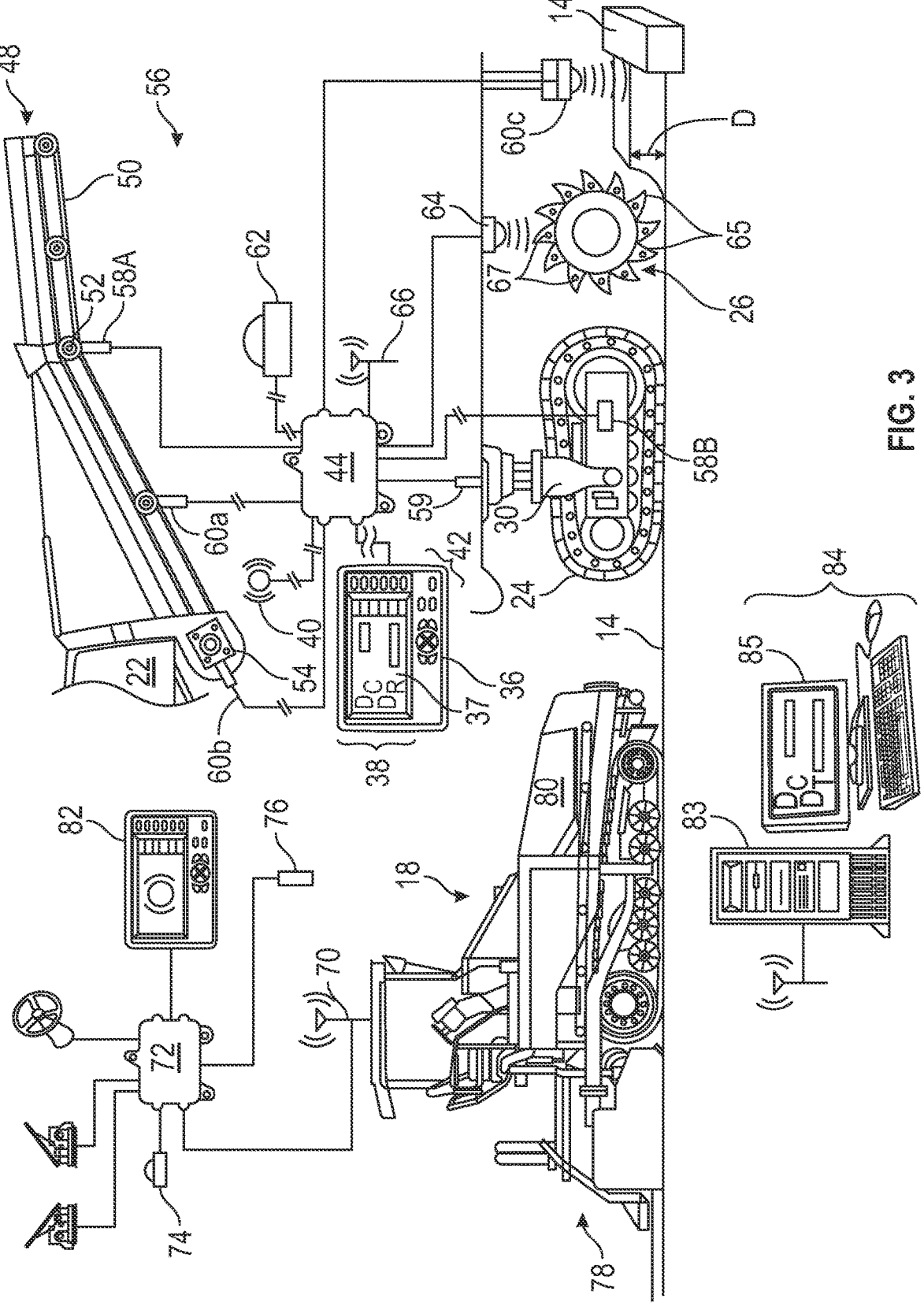
FIG. 3 is a schematic illustration of control systems used to coordinate operations between a milling machine and a paving machine according to the present disclosure.

Frame 22 can also support an operator station 34. Operator station 34 can house any number of interface devices 36 used to control cold planer 10. In the disclosed example, interface devices 36 can include, among other things, display 38, warning device 40, and input device 42, which are shown in FIG. 3. In other embodiments, operator station 34 can be off-board cold planer 10. For example, operator station 34 can embody a remote control, such as a handheld controller, a cellular phone, a tablet, a laptop computer, or any other type of mobile device that can permit an operator to control cold planer 10 from anywhere on or away from worksite 12. Operator station 34 can alternatively embody a software program and a user interface for a computer, and can include a combination of hardware and software. In other embodiments, cold planer 10 can be autonomous and need not include operator station 34.

Referring to FIG. 3, display 38 can be configured to render the location of cold planer 10 (e.g., of milling drum 26) relative to features of the jobsite (e.g., milled and/or un-milled parts of surface 14 and first transport vehicle 20A), and to display data and/or other information as indicia 37 to the operator. Warning device 40 can be configured to audibly and/or visually alert the operator of cold planer 10 as to a proximity of milling drum 26 to the worksite features, and/or when certain pieces of data exceed an associated threshold and/or when transport vehicle 20A is too close. Input device 42 can be configured to receive data and/or control instructions from the operator of cold planer 10. Other interface devices (e.g., control devices) can also be possible, and one or more of the interface devices described above could be combined into a single interface device, if desired.

Input device 42 can be, for example, an analog input device that receives control instructions via one or more buttons, switches, dials, levers, etc. Input device 42 can also or alternatively include digital components, such as one or more soft keys, touch screens, and/or visual displays. Input device 42 can be configured to generate one or more signals indicative of various parameters associated with cold planer 10 and/or its surrounding environment based on input received from the operator, as well as information relating to paver 18 and transport vehicle 20A.

Referring again to FIG. 2, conveyor system 46 can include first conveyor 47 adjacent milling drum 26 that is configured to transfer milled material to second conveyor 48. Conveyor 48 can be pivotally attached to frame 22 so that the height at which milled material leaves conveyor 48 can be adjusted. That is, a pivotal orientation of conveyor 48 in the vertical direction can be adjusted to raise and lower conveyor 48. Conveyor 48 can also be pivotally attached to frame 22 so that the lateral location at which milled material leaves conveyor 48 can be adjusted. That is, a pivotal orientation of conveyor 48 in the horizontal direction can be adjusted to move conveyor 48 from side to side.

First conveyor 47 and second conveyor 48 can each include a belt 50 that is supported on a plurality of roller assemblies 52 and driven by a motor 54. Motor 54 can embody, for example, a hydraulic motor 54 powered by a hydraulic system (not shown). In other embodiments, motor 54 can be an electric motor or another type of motor. Motor 54 can be powered by engine 28 or by another power source.

As illustrated in FIG. 3, control system 56 can be associated with cold planer 10 and include elements that cooperate to monitor and analyze the transfer of paving material out of transport vehicle 16A and milled material into transport vehicle 20A and facilitate communication between cold planer 10 and paver 18 and/or between cold planer 10 and transport vehicles 16A, 16B, 20A and 20B. For example, elements of control system 56 can cooperate to determine a milling rate of cold planer 10. The milling rate of cold planer 10 can be a mass flow rate $\dot{m}$ and/or a volume flow rate $\dot{V}$ of milled material being discharged by cold planer 10 into transport vehicle 20A. The milling rate can be determined with respect to time, distance, or another reference parameter, as desired. Control system 56 can also be configured to determine a total amount (e.g., a total weight W or total volume V) of material that has been milled and/or transferred over a period of milling time, a fill level $\Sigma$ of transport vehicle 20A, an amount of remaining time $T_F$ until transport vehicle 16A is full, and/or other statistical information. Control system 56 can further be configured to determine the location at which transport vehicle 20A will become full, such as by comparing real-time productivity data to threshold productivity values stored in memory, and provide such location to transport vehicle 20B. For example, control system 56 can utilize speed or velocity information to determine a milling rate per distance travelled parameter in order to determine a location where transport vehicle 20A will become full, which is additionally the location where empty transport vehicle 20B will be needed.

Elements of control system 56 can include interface devices 36, belt speed sensor 58A, ground speed sensor 58B, depth sensor 59, one or more material measurement sensors 60a, 60b and 60c ("sensors"), locating device 62, bit wear sensor 64, communication device 66, and controller 44 electronically connected with each of the other elements. Elements of control system 56 can be configured to generate signals indicative of operating parameters associated with cold planer 10 that can be used by controller 44 for further processing. Information, including the mass flow rate $\dot{m}$, volume flow rate $\dot{V}$, total weight W, total volume V, fill level $\Sigma$, and remaining time $T_F$ can be shown to the operator of cold planer 10 via display 38 and used by the operator and/or controller 44 to regulate operating parameters of cold planer 10 (e.g., travel speed, drum rotational speed, milling depth, milling rate, etc.) and/or to dispatch transport vehicles 16A, 16B, 20A and 20B based on the predictive and locating instructions described herein. This information and/or other data can be sent off-board cold planer 10 via communication device 66 for use by operators of paver 18 or transport vehicles 16A, 16B, 20A and 20B, jobsite management, and/or for back office analysis.

Controller 44 can be configured to determine the fill level $\Sigma$ of transport vehicle 20A based on the mass flow rate $\dot{m}$, volume flow rate $\dot{V}$, and/or the total weight W or volume V of the milled material in conjunction with known features of transport vehicle 20A (e.g., geometry, volumetric capacity, shape, tare weight, weight limit, etc.). Using this information and the signals from one or more of sensors 60a-60c, controller 44 can be configured to determine the remaining time $T_F$ until transport vehicle 20A is full (i.e., reaches a threshold, reaches a desired fill level, etc.). For example, controller 44 can compare the mass flow rate $\dot{m}$, volume flow rate $\dot{V}$, total weight W, and/or fill level $\Sigma$ to a weight limit, volumetric capacity, and/or target fill level of transport vehicle 20A over a period of conveying time, and determine how much time remains until transport vehicle 20A will become full. This information can be used to determine when and where to dispatch empty transport vehicle 20B to cold planer 10 or full transport vehicles 16B carrying fresh paving material to paver 18, such as via the dispatch instructions discussed with reference to FIG. 6.

Speed sensor 58A can be configured to generate a signal indicative of a linear belt speed of belt 50. For example, speed sensor 58A can be a shaft-driven sensor that is attached to a roller assembly 52 of second conveyor 48. Roller assembly 52 can be in contact with belt 50 and can be driven by motor 54 (referring to FIG. 2). Roller assembly 52 can alternatively be a free-wheeling pulley, such as an idler, tensioner, or other type of pulley. Speed sensor 58A can alternatively be attached directly to a shaft of motor 54, and its signal can also be indicative of the speed of motor 54. In some embodiments, multiple speed sensors 58A can be utilized and their outputs processed by controller 44 in order to reduce inaccuracies caused by slipping of belt 50. Speed sensor 58A can detect the speed of a shaft or wheel using magnetic, optical, pulsating, or other type of sensing element. Signals generated by speed sensor 58A can be communicated to controller 44 and used for further processing.

Depth sensor 59 can be configured to generate a signal indicative of a depth D (FIG. 3) of milling drum 26 below surface 14. That is, depth sensor 59 can generate a signal indicative of the cutting depth of cold planer 10. In some embodiments, depth sensor 59 can be associated with actuators 30 and configured to generate a signal that can be used by controller 44 to determine the depth D based on the position of actuators 30 in conjunction with known information (e.g., known offsets between frame 22 and milling drum 26). In other embodiments, depth sensor 59 can be configured to generate a signal indicative of a relative position of milling drum 26 with respect to frame 22 or another reference component of cold planer 10.

Sensors 60a-60c can include one or more sensors and/or systems of sensors configured to generate signals indicative of an amount of material being milled and/or transferred into transport vehicle 20A via conveyor 48. For example, sensor 60a can be a belt scale. That is, sensor 60a can include a force transducer that is configured to measure a normal force applied to belt 50 by the weight of material on conveyor 48. The signal generated by sensor 60a can be utilized by controller 44 in conjunction with the signal generated by speed sensor 58A and/or other sensors (e.g., an inclinometer) to determine the mass flow rate $\dot{m}$ and/or a volume flow rate $\dot{V}$ of milled material being transferred into transport vehicle 20A.

Sensor 60b can be configured to generate a signal indicative of an operating parameter that can be used to determine how much power is used to drive conveyor 48. For example, sensor 60b can be configured to measure a hydraulic pressure differential, an electrical voltage, or another parameter of motor 54. The signal generated by sensor 60b can be utilized by controller 44 in conjunction with other parameters (e.g., hydraulic fluid flow rate, motor speed, motor displacement, electrical resistance, electrical current, etc.) to determine the power used to drive conveyor 48. The power used to drive conveyor 48, along with other parameters (e.g., the size and speed of roller assemblies 52, angle of inclination of conveyor 48, etc.) can be utilized by controller 44 to determine the milling rate (e.g., mass flow rate $\dot{m}$ and/or a volume flow rate $\dot{V}$) of cold planer 10.

Sensor 60c can embody a sensor or system that is configured to determine the amount of material being transferred by conveyor 48 without contacting any moving parts of conveyor 48. For example, sensor 60c can include a radioactive detection system, a laser scanning system, an optical scanner, a camera, an ultrasonic sensor, or another type of sensor that is configured to generate a signal indicative of a length (e.g., a width, a height, a depth, etc.), an area, or a volume of material milled by milling drum 26. Other types of sensors or sensing systems can be used, if desired. Signals generated by sensors 60a-c can be utilized by controller 44 in conjunction with other parameters (e.g., belt speed) to determine the milling rate of cold planer 10 (e.g., mass flow rate $\dot{m}$ and/or a volume flow rate $\dot{V}$ of milled material).

As discussed herein, outputs of sensors 60a-60c can be used to generate real-time productivity values for the output of cold planer 10. The productivity values can be compared to threshold productivity values for various types of transport vehicles, including transport vehicle 20A, stored in memory for controller 44 or elsewhere. As such, controller 44 can calculate an estimated time and place for when the threshold productivity value will be reached, such as by using output of locating device 62 as well as route information from a work plan.

Locating device 62 can be configured to generate a signal indicative of a geographical position of the cold planer 10 relative to a local reference point, a coordinate system associated with the work area, a coordinate system associated with Earth, or any other type of 2-D or 3-D coordinate system. For example, locating device 62 can embody an electronic receiver configured to communicate with one or more satellites, or a local radio or laser transmitting system used to determine a relative geographical location of itself. Locating device 62 can receive and analyze high-frequency, low-power radio or laser signals from multiple locations to triangulate a relative 3-D geographical position. A signal indicative of this geographical position can then be communicated from locating device 62 to controller 44. In examples, locating device 62 can comprise a global positioning system (GPS) sensor, global navigation satellite system (GLONASS) sensor and the like.

Bit wear sensor 64 can be configured to detect when one or more cutting bits 65 attached to milling drum 26 exceed a wear threshold. Cutting bits 65 can be configured to emit at least one signal via one or more transmitters 67 disposed within each cutting bit 65. Transmitters 67 can be sacrificial components disposed within cutting bit 65 at a depth below an outer surface such that transmitters 67 remain intact and emit a signal until cutting bit 65 becomes worn (i.e., wears beyond the threshold). When cutting bit 65 exceeds the wear threshold, transmitters 67 can become exposed. Once exposed, transmitters 67 can be destroyed and stop emitting signals or fall out of cutting bit 65. Each transmitter 67 can be, for example, a radio frequency identification (RFID) tag that emits a signal indicative of an ID. Bit wear sensor 64 can be configured to detect the signal emitted by each transmitter and communicate the signals to controller 44. Transmitter 67 can be another type of transmitter capable of generating a signal from within cutting bit 65, if desired. In examples, output of bit wear sensor 64 can be used to determine predicted location information for transport vehicle 20B, such as by determining when a paving train operation is about to be interrupted based on expected or unexpected replacement of cutting bits 65.

Communication device 66 can include hardware and/or software that enables sending and receiving of data messages between controller 44 and an off-board entity, such as transport vehicles 20A and 20B. The data messages can be sent and received via a direct data link and/or a wireless communication link, as desired. The direct data link can include an Ethernet connection, a connected area network (CAN), or another data link known in the art. The wireless communications can include one or more of satellite, cellular, Bluetooth, WiFi, infrared, and any other type of wireless communications that enables communication device 66 to exchange information.

Figure 4:
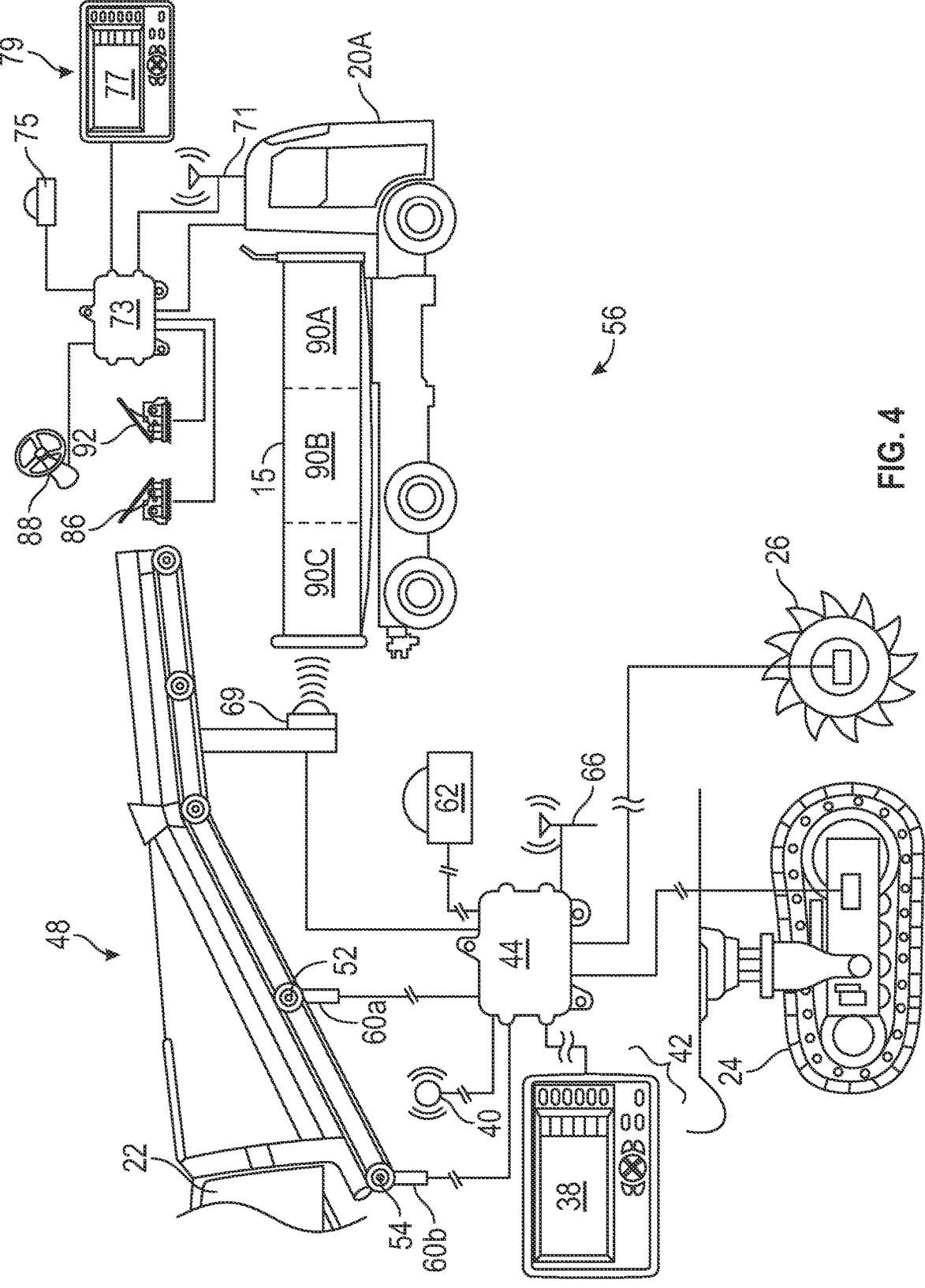
FIG. 4 is a schematic illustration of control systems used to coordinate operations between a milling machine and a transport vehicle according to the present disclosure.

Communication device 66 can be configured to communicate with paver 18 via a communication device 70 electronically connected to a controller 72 of paver 18 (FIG. 3) and communication device 71 electronically connected to controller 73 of transport vehicle 20A (FIG. 4). In this way, controller 44 of cold planer 10 can be configured to receive inputs and other information from controller 72 of paver 18. Such inputs can include, for example, one or more signals indicative of a position of paver 18, a paving rate of paver 18, an amount of available paving material for use by paver 18, an amount of available paving time, and or other information relating to the paving process being carried out by paver 18. For instance, paver 18 can include a locating device 74 configured to generate a signal indicative of the position of paver 18. The signal generated by locating device 74 and locating device 75 (FIG. 4) can be indicative of an absolute position (e.g., a GPS coordinate location) or a relative distance (e.g., based on a laser-, an ultrasonic-, or a radio-based measurement system) between cold planer 10 and paver 18 and cold planer 10 and transport vehicles 20A and 20B.

Paver 18 can also include one or more sensors 76 configured to generate signals indicative of parameters that can be used to determine the paving rate of paver 18. Sensors 76 can include, for example, position sensors associated with components of a screed 78 attached to paver 18. The signals generated by sensors 76 can be indicative of or used to determine the height of screed 78 above surface 14, the width of screed 78, and/or the angle of one or more screed plates with respect to surface 14. Based on these signals and in conjunction with other information (e.g., the ground speed of paver 18, the density of the paving material, etc.), controller 72 or controller 44 can be configured to determine the paving rate (e.g., volumetric flow rate, mass flow rate, etc.) of paver 18. The paving rate of paver 18 can be an amount of paving material (e.g., a weight, a mass, a volume, etc.) laid down on surface 14 with respect to a reference parameter, such as time or distance.

The amount of available paving material can be an amount of paving material available within a hopper 80 of paver 18, material available within transport vehicle 16A (referring to FIG. 1), or material available from a paving material plant for a given period, such as a particular day, shift, or project. In some cases, the amount of available material can be transmitted to paver 18 from a communication device at the plant, which can then be transmitted to cold planer 10. In other cases, the amount of available paving material can be transmitted directly to cold planer 10. Furthermore, the amount of paving material can be determined by comparing paving rate information of paver 18 to capacity information of transport vehicle 16A. The capacity of transport vehicle 16A can be stored in memory of controller 44. Thus, as paving material is consumed by paver 18, controller 44 can calculate the remaining load within transport vehicle 16A to determine when transport vehicle 16A will become empty.

The amount of available paving time can be determined by worksite personnel or dictated by job constraints, such as an amount of time allotted by a customer or regulatory body. For example, paving time can be limited to time between morning and evening rush hours, off-peak usage times, daylight or nighttime hours, etc. The amount of available paving time can be entered via an interface device 82 associated with paver 18, via interface device 36 of cold planer, or provided by an off-board entity, such as an off-board computer 84. Other operating parameters of paver 18, such as a ground speed, a heading, an operational status (e.g., running, stopped, malfunctioning, etc.), or other information can also be communicated from paver 18 to cold planer 10.

Control system 56 can further be configured to determine the locations at which transport vehicle 16A and transport vehicle 20A will become empty and full, respectively, and provide such location to a full or empty transport vehicle, respectively, enroute to worksite 12 from an asphalt plant or a dump site, respectively. For example, control system 56 can utilize speed or velocity information in combination with depth of cut and cut width information, to determine a paving rate or milling rate per distance travelled parameter in order to determine a location where transport vehicle 16A will become empty and a location where transport vehicle 20A will become full, which are additionally the locations where a full transport vehicle 16B will be needed and an empty transport vehicle 20B will be needed, respectively. For example, speed can be used to determine when a new transport vehicle is needed and cut depth and cut width can be used to determine the volume of milled material removed. This information can be combined with payload capacity for transport vehicles to determine the distance forward of cold planer 10 where the next transport vehicle is needed.

It is noted that any information provided to or generated by cold planer 10 and paver 18 can additionally be provided by or to off-board computer 84. For instance, any information generated by paver 18, such as the position, paving rate, and speed of paver 18, can be communicated from paver 18 to off-board computer 84, and then from off-board computer 84 to cold planer 10. As such, information for the entire paving train can be shared between cold planer 10, paver 18, transport vehicles 16A, 16B, 20A and 20B and off-board computer 84. Other information relating to the paving process, such as the amount of available paving time and material, the density of the paving material, jobsite plans, etc., can also or alternatively be provided to cold planer 10 directly from off-board computer 84. Off-board computer 84 can be any type of back office computer 83, laptop computer 85, cellular phone, personal digital assistant, tablet, dedicated hardware device, or other type of stationary or mobile computing device configured to communicate information via a wired or wireless connection.

Controller 44 can embody a single microprocessor or multiple microprocessors that include a means for monitoring operator and sensor input, and responsively adjusting operational characteristics of cold planer 10 based on the input. For example, controller 44 can include a memory, a secondary storage device, a clock, and a processor, such as a central processing unit or any other means for accomplishing a task consistent with the present disclosure. Numerous commercially available microprocessors can be configured to perform the functions of controller 44. It should be appreciated that controller 44 could readily embody a general machine controller capable of controlling numerous other machine functions. Various other known circuits can be associated with controller 44, including signal-conditioning circuitry, communication circuitry, and other appropriate circuitry. Controller 44 can be further communicatively coupled with an external computer system, instead of or in addition to including a computer system, as desired.

As discussed herein, control system 56 can further be configured to communicate any information from paver 18 and cold planer 10 to various transport vehicles, such as transport vehicles 16A, 16B, 20A and 20B (FIG. 1). FIG. 4 illustrates an example of cold planer 10 communicating with transport vehicle 20A. Paver 18 can be configured to communicate with transport vehicles 16A and 16B in a similar manner.

FIG. 4 is a schematic illustration of control system 56 used to coordinate operations between cold planer 10 and transport vehicle 20A according to the present disclosure.

Position sensor 69 can be configured to generate a signal indicative of a distance between conveyor 48 and other objects, such as transport vehicle 20A, by physically sensing the location of the other objects. For example, position sensor 69 can be an optical sensor, an ultrasonic sensor, a laser sensor, or another type of sensor that is configured to generate a signal indicative of a distance between another object and itself. Position sensor 69 can be mounted to conveyor 48 or at another location on cold planer 10 where it is able to detect objects in front of and/or to the side of conveyor 48.

The signal generated by position sensor 69 can be utilized by controller 44 to generate a quantitative and/or qualitative representation of the distance between conveyor 48 and transport vehicle 20A For example, the signal generated by position sensor 69 can be utilized to determine an actual distance between conveyor 48 and transport vehicle 20A. The signal can also or alternatively be utilized by controller 44 to generate audible and/or visible indicia of distance, such as by varying sounds (e.g., beeps, tones, etc.) and/or lights (e.g., flashes, bars, colors, etc.). This information can be utilized by controller 44 to automatically maintain or allow operators to manually maintain a desired distance between conveyor 48 and transport vehicle 20A. This distance can be controlled in order to ensure that transport vehicle 20A is properly loaded with milled material. This information can also be used by controller 44 to prevent unintended contact between cold planer 10 and transport vehicle 20A, such as by notifying operators when transport vehicle 20A is within a threshold distance of conveyor 48.

Position sensor 69 can also be configured to generate signals indicative of distances between conveyor 48 and various features and/or parts of transport vehicle 20A. That is, position sensor 69 can be configured to identify profiles, edges, and/or other features of transport vehicle 20A, and generate a signal indicative of a distance between those features and a reference point, such as a center of position sensor 69 or a location on conveyor 48. This information can be used during a milling operation to determine a position of conveyor 48 with respect to transport vehicle 20A. For example, position sensor 69 can be configured to determine the distances between conveyor 48 and the lateral sides of transport vehicle 20A (e.g., left, right, front, back, etc.), and these distances can be utilized by controller 44 to ensure proper loading of transport vehicle 20A and prevent spillage of milled material.

Communication device 66 can be configured to communicate with first transport vehicle 20A via a communication device 71 electronically connected to a controller 73 of transport vehicle 20A. When cold planer 10 and first transport vehicle 20A are far from each other, data can be transferred between communication devices 66, 71 via a cellular network, satellite network, or other long-distance data network. Information from transport vehicle 20A, such as a signal indicative of a geographic position generated by locating device 75, vehicle ID, and other desired information can be communicated over the long-distance network. When cold planer 10 and transport vehicle 20A are near each other, communication devices 66, 71 can automatically form a communication link via a short-distance network, such as a Bluetooth, infrared, WiFi, or other network for sharing greater amounts of data. The short-distance network can be more efficient and cost effective for transferring greater amounts of data during a milling operation than the long-distance network.

Controller 44 can be configured to receive inputs and other information from transport vehicle 20A via communication device 66. Such inputs can include for example, the vehicle ID and/or the associated profile of transport vehicle 20A. In one embodiment, controller 44 can directly receive each piece of information in the associated profile of transport vehicle 20A via communication device 66. Such information can include, for example, a predetermined volumetric capacity, geometric dimensions (e.g., length, width, height, etc.), shape or image, tare weight, weight limit WL, desired payload (e.g., target fill level, target weight, target volume, desired material, etc.), current fill level, and/or other parameters. Controller 44 can additionally include memory, such as non-transitory computer-readable medium, in which can be stored a database of information relating to transport vehicle IDs, transport vehicle types, weight limits for such vehicles, hauling or volumetric capacity for such vehicles, and the like. In other embodiments, controller 44 can store the associated profile of any number of receptacles, such as transport vehicle 20A, and reference them by ID so that only the ID and/or new information needs to be communicated via device 66 during the milling operation. Profile information can be periodically updated by connecting controller 44 to a server, a data bank, or a receptacle controller via communication device 66. Furthermore, memory for controller 44 can include route information for a work plan for a paving train. The route information can include geolocations, e.g., latitude and longitude coordinates, for the path of the paving train. As such, the predicted locations for where transport vehicles full of fresh asphalt and empty transport vehicles can be guided to locations along the route based on the predicted information discussed herein. The predicted locations can comprise hook-up locations where the new transport vehicle will be integrated into the paving train.

Using the input from transport vehicle 20A and other information, controller 44 can be configured to determine an amount of material being transferred into transport vehicle 20A. For example, controller 44 can be configured to determine a mass flow rate $\dot{m}$ of milled material being transferred by conveyor 48 and to show the mass flow rate $\dot{m}$ and other information on display 38. Controller 44 can receive the signal from material measurement sensor 60a that is indicative of a force, pressure, volume, voltage, etc., and controller can determine the mass m of material on belt 50 based on the signal. Using the mass m in conjunction with other information (e.g., belt speed), controller 44 can be configured to determine the mass flow rate $\dot{m}$ of material being transferred by conveyor 48. Controller 44 can continually determine the mass flow rate $\dot{m}$ and determine the total weight Wm of material that has been transferred by conveyor 48 into transport vehicle 20A over an elapsed period of conveying time based on the mass flow rate $\dot{m}$. The total weight Wm of milled material can also or alternatively be determined based on the volume flow rate $\dot{V}$ and a known density of the milled material.

Controller 44 can be configured to determine a total weight $W_{total}$ and a fill level $\Sigma$ of transport vehicle 20A based on the mass flow rate $\dot{m}$, volume flow rate $\dot{V}$, and/or weight $W_m$ of the milled material and known features of transport vehicle 20A (e.g., geometry, volumetric capacity, shape, tare weight, weight limit $W_L$, etc.) received via communication device 66. Using this information and the signal from sensor $60a$, controller 44 can be configured to determine the remaining time $T_F$ until transport vehicle 20A is full (i.e., reaches a threshold, reaches a desired fill level, etc.). For example, controller 44 can compare the mass flow rate $\dot{m}$, volume flow rate $\dot{V}$, weight $W_m$, and/or fill level $\Sigma$ to the weight limit $W_L$, volumetric capacity, and/or target fill level of transport vehicle 20A over a period of conveying time, and determine how much time remains until transport vehicle 20A will become full. Furthermore, this time information can be used to determine a location at which transport vehicle 20A will become full. Such location can be determined before transport 20A becomes full such that transport vehicle 20B can be provided with sufficient time to arrive at the location.

Controller 44 can be configured to show one or more of the fill level $\Sigma$, remaining time $T_F$ until transport vehicle 20A is full, volume flow rate $\dot{V}$, mass flow rate $\dot{m}$, weight $W_m$, total weight $W_{total}$ of transport vehicle 20A, and/or other information to the operator of cold planer 10 via display 38. Controller 44 can also be configured to communicate this and other information via communication device 66 and show it to the operator of transport vehicle 20A via display screen 77 of user interface device 79 located within an operator station of transport vehicle 20A. In this way, operators of cold planer 10 and transport vehicle 20A can be able to monitor and control the filling process with the same information. It should be noted that controller 44 can also be configured to communicate this information to other receptacles and devices that are capable of receiving such information, such as second transport vehicle 20B (referring to FIG. 1) and back office computers.

Controller 44 can be configured to automatically control some aspects of cold planer 10 and the milling process, as well as transport vehicles 20A and 20B. For example, controller 44 can be configured to automatically control operations of cold planer 10 based on the fill level $\Sigma$ and/or total weight $W_{total}$ of transport vehicle 20A. That is, controller 44 can monitor the fill level $\Sigma$ and total weight $W_{total}$ of transport vehicle 20A, and automatically slow or stop the movement of traction devices 24, milling drum 26, and/or second conveyor 48 as the fill level $\Sigma$ approaches a threshold (e.g., 90% filled) or becomes full (e.g., 100% filled) or when the total weight $W_{total}$ reaches a threshold (e.g., a desired, legal, or other weight limit $W_L$). It is understood that other thresholds can be used, if desired.

When the threshold fill level $\Sigma$ or total weight $W_{total}$ of first transport vehicle 20A has been reached or exceeded, first transport vehicle 20A can be full and ready to be replaced by second transport vehicle 20B (referring to FIG. 1). Before first transport vehicle 20A is full, but after the fill level $\Sigma$ or total weight $W_{total}$ has exceeded an intermediate threshold, controller 44 can automatically generate a dispatch signal and communicate the signal to first transport vehicle 20A and/or another receptacle, such as second transport vehicle 20B. The dispatch signal can be indicative of a request for first transport vehicle 20A to depart from cold planer 10 once transport vehicle is full. The dispatch signal can also or alternatively be indicative of a request for another receptacle to approach cold planer 10 or to move to a predictive location ahead of cold planer 10 as discussed herein, to allow the milling process to continue.

For example, controller 44 can receive a location signal from second transport vehicle 20B and/or a number of other receptacles via communication device 66. Based on the location signals, controller 44 can determine the distance and/or time between each of the receptacles and cold planer 10, and communicate the dispatch signal to a receptacle that is able to arrive before the remaining time $T_F$ expires. In some situations, controller 44 can send the dispatch signal to the closest receptacle. In examples, the dispatch signal can comprise a location, geographic coordinates, a map, or driving instructions for transport vehicle 20B relating to where transport vehicle 20B should be when it is anticipated that transport vehicle 20A becomes full, as discussed with reference to FIG. 6. Controller 44 can alternatively send the dispatch signal to an offboard dispatching center where personnel and/or computers can be able to use the dispatch signal for directing transport vehicles to and from cold planer 10.

Controller 44 can allow milling drum 26 and first conveyor 47 to continue running for a period of time while second conveyor 48 is stopped when transport vehicle 20A and transport vehicle 20B are maneuvering around cold planer 10. For example, controller 44 can stop second conveyor 48 after first transport vehicle 20A has been filled to allow first transport vehicle 20A to depart and second transport vehicle 20B to approach cold planer 10 and prepare to receive material. During this time, milling drum 26 and first conveyor 47 can continue to run and transfer material to a buffer space associated with second conveyor 48. When second transport vehicle 20B is properly positioned (e.g., within a proper distance of conveyor 48), controller 44 can automatically restart second conveyor 48 to begin filling second transport vehicle 20B. In this way, the milling process can be continuous and can avoid energy losses associated with the stopping and restarting of other components of cold planer 10.

Controller 44 can also be configured to generate commands to ensure transport vehicle 20A is properly loaded with milled material. For example, controller 44 can determine a distance between conveyor 48 and transport vehicle 20A based on the signals received from locating device 62 and/or position sensor 69, and automatically shut off conveyor 48 when the distance exceeds a threshold. That is, controller can determine distances between conveyor 48 and the lateral sides (e.g., left, right, front, back, etc.) of transport vehicle 20A based on the signals from locating device 62, position sensor 69, and/or known dimensions of transport vehicle 20A to determine when conveyor 48 is properly positioned over bed 15 of transport vehicle 20A. When conveyor 48 is not properly positioned over the bed 15 of transport vehicle 20A, controller can shut off conveyor 48 to prevent bed 15 from being improperly loaded or to prevent material spillage over the sides of transport vehicle 20A.

To achieve and maintain proper positioning of conveyor 48 with respect to transport vehicle 20A, controller 44 can generate commands to adjust the position of conveyor 48 with respect to transport vehicle 20A based on the signals from sensor 69, locating device 62, position sensor 69, and/or the input received from transport vehicle 20A. For example, while controller 44 is determining the fill level $\Sigma$ of transport vehicle 20A based on the signal from sensor 69, controller 44 can also determine the distance between conveyor 48 and transport vehicle 20A based on the signals from position sensor 69 and/or one or more of locating devices 62 and 75. Controller 44 can coordinate the signals from sensor 69 with the determined distance and known dimensions of transport vehicle 20A (e.g., received as input from transport vehicle 20A) in order to track the distribution of material within bed 15 over a period of conveying time. The material distribution can include a front-to-back distribution as well as a side-to-side distribution within bed 15. As discussed with reference to FIG. 5, controller 44 can project toward the ground or other area visible to the transport vehicle operator an instruction for transport vehicle 20A to follow to correct or maintain proper positioning, such as laser indicia or other visual indicators.

Commands to maintain proper positioning of conveyor 48 with respect to transport vehicle 20A can include commands to adjust one or more of a travel speed and a travel direction of transport vehicle 20A. For example, based on the distance between conveyor 48 and transport vehicle 20A, controller 44 can determine a speed and direction of travel of transport vehicle 20A that will cause milled material being discharged by conveyor 48 to land in a desired section of bed 15. That is, controller 44 can generate commands to control the speed and direction of transport vehicle 20A so that milled material can be evenly dispersed among, for example, a front section 90A, a middle section 90B, and a rear section 90C of bed 15. By speeding up, slowing down, and/or steering transport vehicle 20A while cold planer 10 maintains a desired course, milled material can be spread evenly among the sections 90A, 90B and 90C of bed 15. It is understood that bed 15 can be divided into more or fewer sections, if desired.

Commands to adjust the travel speed and direction of transport vehicle 20A from controller 44 can be communicated via communication device 66 to the operator of transport vehicle 20A, as well as by projector 116. For example, controller 44 of cold planer 10 can generate speed and/or directional commands and show them to the operator of transport vehicle 20A via display screen 77 (FIG. 6) in the operator station of transport vehicle 20A. Such commands can include visible indicia (e.g., arrows, lights, numbers, letters, etc.) of a desired change to the speed and/or direction of transport vehicle 20A as commanded by controller 44 and projected onto ground surface 14. In other embodiments, audible signals can also or alternatively be generated and communicated to the operator of transport vehicle 20A, if desired. In this way, controller 44 can assist the operator of transport vehicle 20A by providing clear and accurate instructions for maintaining a proper distance from conveyor 48 throughout the milling operation to ensure milled material is evenly distributed within bed 15. This assistance can also allow the operator of cold planer 10 to focus more on other aspects of the milling process and less on communicating with the operator of the transport vehicle.

Commands from controller 44 for adjusting the travel speed and direction of transport vehicle 20A can also or alternatively be communicated via communication device 66 to controller 73 for automatic control of transport vehicle 20A. For example, after controller 44 establishes a communication link with transport vehicle 20A, controller 44 can send a request to the operator of transport vehicle 20A via display screen 77 seeking control of transport vehicle during the filling process. The operator of transport vehicle 20A can accept or decline the request via an associated interface (e.g., a button, a soft key, a touch screen, etc.). In other examples, transport vehicle 20A can be a fully autonomous vehicle without an operator or the need for an operator to accept a request for control from controller 44.

When the operator of transport vehicle 20A accepts the request for control from controller 44 of cold planer 10, controller 44 and controller 73 can cooperate to perform parameter checks to ensure proper conditions are present for automatic control of transport vehicle 20A by cold planer 10. For example, controllers 44 and/or 73 can check to make sure transport vehicle 20A is in a proper gear for automatic control. This can include determining whether a transmission, a transfer case, a final drive, or other gearbox or gearing device is in an appropriate or desired position. Controllers 44 and 73 can ensure transport vehicle 20A is, for example, out of a neutral gear, in a forward gear, and in a low gear or another appropriate gear for controlling the travel speed of transport truck. Controllers 44, 73 can also check to ensure a parking brake of transport vehicle 20A is deactivated or in an off position to allow transport vehicle 20A to move in the desired direction.

Various sensors can also be checked and monitored to ensure controller 44 receives accurate data during the automatic control process. For example, controller 44 can monitor sensors on cold planer 10, such as speed sensor 58A, material measurement sensors 60*a*-60*c*, locating device 62, and position sensor 69. In this way, controller 44 can be able to verify that it is receiving the needed or desired data to determine how to control transport vehicle 20A and whether such data are within respective data limits for proper automatic control. Controllers 44 and 73 can cooperate to ensure that sensors onboard transport vehicle 20A are also properly functioning. For example, locating device 75 as well as a ground speed sensor 58B, a throttle position sensor, a steering position sensor, a service brake position sensor, and/or other sensors can be checked to ensure that data is being received from each sensor and that the data from each sensor is within a respective limit for proper automatic control.

Transport vehicle 20B can be operated by controller 44 in a similar manner as transport vehicle 20A in order to drive transport vehicle 20B to the hook-up location for the paving train. After the request to take control of one or both of transport vehicles 20A and 20B is accepted and the parameter checks have begun or are completed, controller 44 can control the speed and travel direction of transport vehicles 20A and 20B by controlling, for example, accelerator 92, service brake 86, and steering device 88 of transport vehicles 20A and 20B. Controller 44 can automatically control the positions of accelerator 92, service brake 86, and/or steering device 88 to speed up, slow down, and/or steer transport vehicles 20A and 20B to achieve proper positioning of transport vehicles 20A and 20B relative to conveyor 48. In this way, inefficient and improper loading of bed 15 caused by miscommunication between the operators of cold planer 10 and transport vehicles 20A and 20B can be reduced, and the operators can be able to direct their attention to other tasks associated with the milling operation.

As controller 44 is automatically controlling operations of transport vehicles 20A and 20B, information relating to the automated control can be shown to the operator of transport vehicles 20A and 20B via display screen 77. For example, the positions of accelerator 92, service brake 86, steering device 88, a gear shifter, and/or other devices can be shown. For example, the positions of accelerator 92 and service brake 86 can be shown as a percent of full actuation (e.g., percent of depression, percent of maximum throttle, etc.), and the position of steering device 88 can be shown as a percent of full actuation in either a right or left direction. Other types of visual representations (e.g., sliding bars, color bars, dials, numbers, etc.) and audible representations (e.g., beeps, tones, etc.) can be used to convey speed and steering information.

When transport vehicle 20A is filled, controller 44 can send a message to the operator of transport vehicle 20A requesting to return control of transport vehicle 20A to the operator. Upon accepting the request (e.g., via an associated interface), the operator can regain full control of transport vehicle 20A. At any time during automatic control of transport vehicles 20A and 20B, however, the operator can manually regain control of transport vehicle 20A by manipulating any of accelerator 92, service brake 86, and steering device 88. Controller 44 can acknowledge the operator's intervention and the automatic control process can be terminated until appropriately restarted.

Commands from controller 44 to maintain proper positioning of conveyor 48 with respect to transport vehicles 20A and 20B can also or alternatively include commands to adjust the pivotal orientation of conveyor 48 about horizontal and vertical axes. For example, for a given horizontal distance between conveyor 48 and one of transport vehicles 20A and 20B, adjusting the vertical orientation of conveyor 48 about a horizontal axis can allow milled material to be spread evenly among sections 90A, 90B and 90C of bed 15. When transport vehicle 20A or 20B is at least partially in front of cold planer 10, changing the vertical orientation of conveyor 48 can change the front-to-back distribution of material within bed 15. When transport vehicle 20A or 20B is at least partially offset to one side of cold planer 10, changing the vertical orientation of conveyor 48 can also change the side-to-side distribution of milled material within bed 15. Similarly, changing the horizontal orientation of conveyor 48 about a vertical axis can also allow the side-to-side distribution (when transport vehicle 20A is in front of cold planer 10) and the front-to-back distribution (when transport vehicle 20A or 20B is offset to one side of cold planer 10) of material within bed 15 to be controlled.

Based on the distance between conveyor 48 and the sides of transport vehicle 20A or 20B, controller 44 can generate commands to change the vertical and horizontal pivotal orientations of conveyor 48 and show them to the operator of cold planer 10 via display 38. Such commands can include visual indicia of desired actions (e.g., arrows, blinking lights, letters, numbers, images, etc.). In other embodiments, audible indicia can also be generated by an associated speaker or other sound-generating device. Controller 44 can also or alternatively be configured to automatically control the pivotal orientation of conveyor 48. For example, controller 44 can automatically send signals to actuators (e.g., pumps, motors, solenoids, etc.) that are configured to change the vertical and/or horizontal orientations of conveyor 48.

Controller 44 can embody a single microprocessor or multiple microprocessors that include a means for monitoring operator and sensor input, and responsively adjusting operational characteristics of cold planer 10 based on the input. For example, controller 44 can include a memory, a secondary storage device, a clock, and a processor, such as a central processing unit or any other means for accomplishing a task consistent with the present disclosure. Numerous commercially available microprocessors can be configured to perform the functions of controller 44. It should be appreciated that controller 44 could readily embody a general machine controller capable of controlling numerous other machine functions. Various other known circuits can be associated with controller 44, including signal-conditioning circuitry, communication circuitry, and other appropriate circuitry. Controller 44 can be further communicatively coupled with an external computer system, instead of or in addition to including a computer system, as desired.

Figure 5:
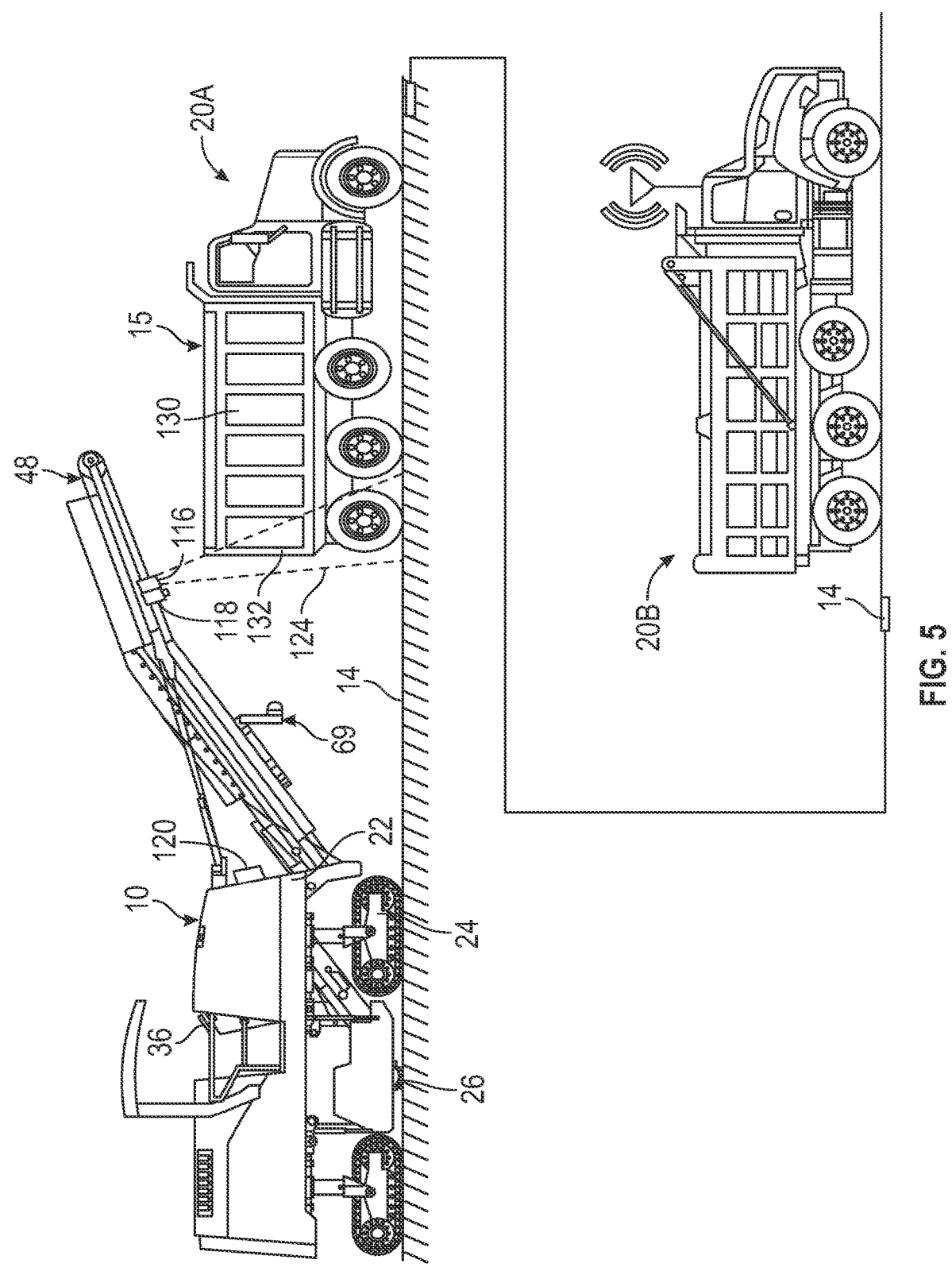
FIG. 5 is a schematic illustration showing a milling machine providing locating instructions to a first haul truck and predictive location information to a second haul truck.

FIG. 5 is a schematic illustration showing cold planer 10 providing locating instructions to first transport vehicle 20A and predictive location information to second transport vehicle 20B. The predictive location information can comprise macro-instructions to direct a queued transport vehicle to a location out front of, and generally out of view of, the paving train. The locating instructions can comprise micro-instructions that can be used to guide the queued transport vehicle into engagement or "hook-up" with the paving train.

Cold planer 10 can comprise projector 116, image capturing device 118 and output device 120, which all can be operatively coupled to controller 44. Projector 116 can be configured to generate light beam 124.

Projector 116 can be an optical device that projects one or more light beams 124 on one or both of ground surface 14 and first transport vehicle 20A. Projector 116 can include a light source (not shown), such as a laser light source, for projecting light beams 124. Projector 116 can be mounted on conveyor system 46 (e.g., to an underside of conveyor system 46) of cold planer 10. It will be appreciated by persons skilled in the art that although projector 116 is shown to be mounted to the underside of the conveyor system 46, projector 116 can alternatively be installed at any portion of cold planer 10 to project light beams 124, in accordance with various aspects of the present disclosure.

In accordance with various examples of the present disclosure, projector 116 can be configured to project light beams 124 on the ground surface 14 and/or first transport vehicle 20A to form different patterns, depending upon the preferences of the worksite operator or upon the type of machine comprising first transport vehicle 20A and cold planer 10. In some examples, light beams 124 can include at least two light beams that are configured to be projected on ground surface 14 to form an L-shaped (that is, orthogonal) pattern on ground surface 14 and align with at least two corresponding sides, i.e., first side wall 130 and rear side wall 132 of bed 15 of first transport vehicle 20A. Such an L-shaped pattern can be used for side loading. In some examples, light beams 124 can include at least three light beams that are configured to be projected on ground surface 14 to form a U-shaped pattern (having two straight side segments intersecting an orthogonal straight bottom segment) on ground surface 14 and align with at least three corresponding sides of bed 15, i.e., first side wall 130, rear side wall 132, and a second side wall opposite first side wall 130. In some embodiments, the two straight side segments can be parallel to each other. Such a U-shaped pattern can be used for front loading. In some examples, the one or more light beams 124 can include a light beam configured to be projected laterally across first transport vehicle 20A such that light beam 124 is projected in-part on a portion of rear side wall 132 of first transport vehicle 20A and in-part on ground surface 14. Such pattern can be used independently for both side loading and front loading or can also be combined with other L-shaped and U-shaped patterns. In some examples, light beams 124 can also act as reference lines for the operator of first transport vehicle 20A while aligning first transport vehicle 20A with respect to cold planer 10.

Image capturing device 118 can be configured to capture images of light beams 124 and first transport vehicle 20A. Image capturing device 118 can include a camera or a combination of cameras. Image capturing device 118 can be configured to capture a sequence of images at regular intervals, for example, at thirty frames per second. Examples of the images include, but are not limited to, two-dimensional images, three-dimensional images, and so on. Image capturing device 118 can be installed on conveyor system 46 of cold planer 10 and can be configured to capture one or more images of first transport vehicle 20A with respect to light beams 124. It will be appreciated by persons skilled in the art that although image capturing device 118 is shown to be mounted to an underside of conveyor system 46, image capturing device 118 can alternatively be installed at any portion of cold planer 10 from where image capturing device 118 can be able to capture the images of first transport vehicle 20A and light beams 124, in accordance with various aspects of the present disclosure.

Controller 44 can be configured to determine a position of first transport vehicle 20A with respect to light beams 124 based on the images. To this end, controller 44 can be configured to obtain the images of light beams 124 and first transport vehicle 20A from image capturing device 118 and determine whether one or more characteristics of light beams 124 shifts from a first condition to a second condition. The characteristics include a continuity of light beams 124.

Controller 44 can be configured to utilize various image processing techniques to determine the change in the characteristics of light beams 124. To this end, controller 44 can be configured to compare pixel values of those pixel frames corresponding to light beams 124 in the sequence of images to determine any change in the pixel values of such pixel frames. Controller 44 is further configured to compare the change in the pixel value with a threshold change value. When the change in the pixel value is greater than the threshold change value, controller 44 can be configured to designate light beams 124 as discontinuous light beams corresponding to the broken condition of light beams 124. When the change in the pixel value is less than or equal to the threshold change value, controller 44 can be configured to designate light beams 124 as continuous light beams corresponding to the continuous condition of light beams 124. The threshold change value distinguishes between the discontinuity owing to the light beams encountering irregularities on surface 14 such as rocks and stones and the discontinuity owing to the light beams encountering parts of first transport vehicle 20A.

Figure 6:
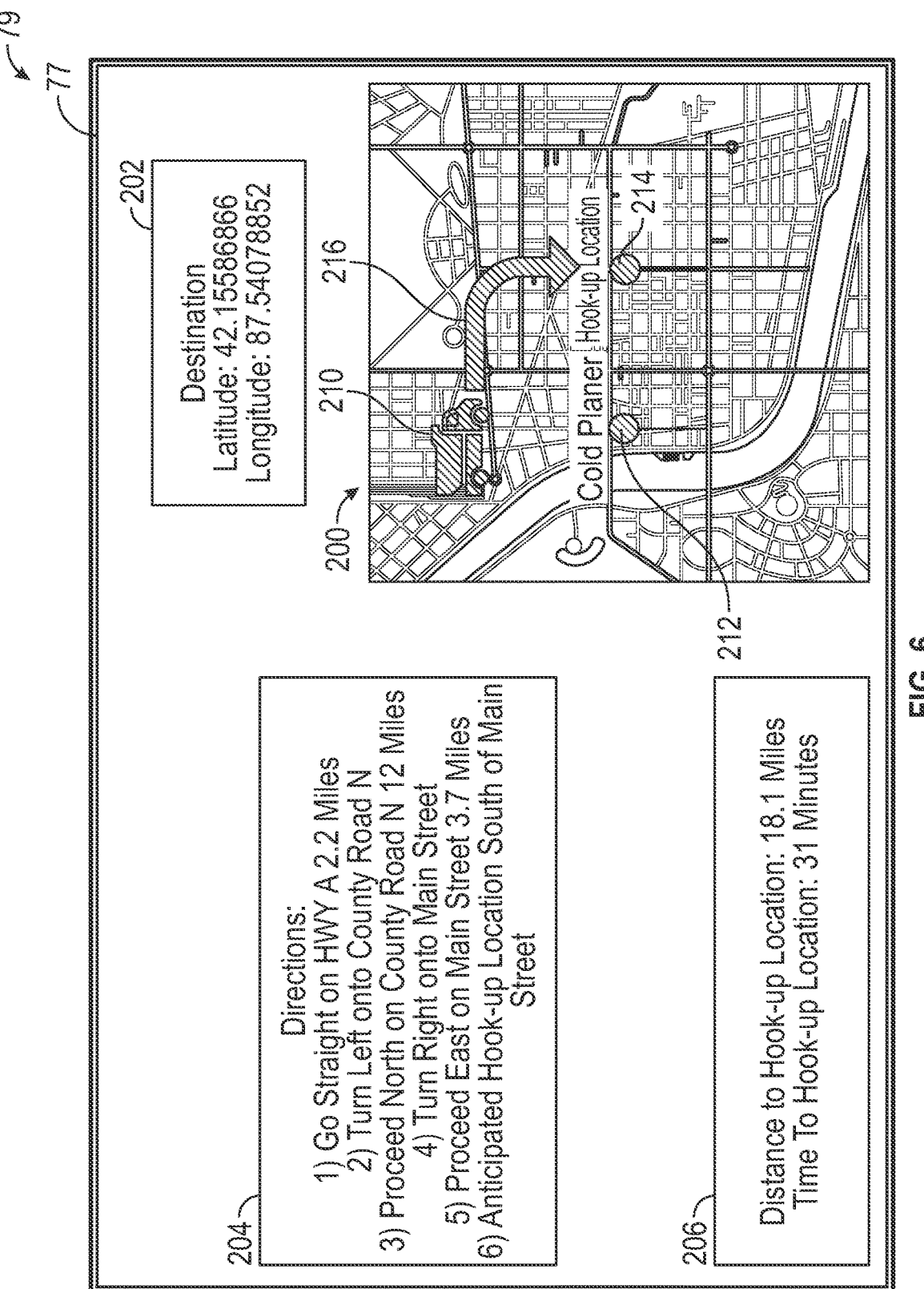
FIG. 6 is a schematic illustration of a display screen for a user interface device of a transport vehicle providing location and guidance indicia for directing a transport vehicle to a paving train hook-up location.

In accordance with the present disclosure, light beams 124 can be used to guide transport vehicle 20B into alignment with cold planer 10. Thus, light beams 124 can provide micro-instructions or locating instructions to second transport vehicle 20B following, or in conjunction with, predictive location information provided to display screen 77 (FIGS. 4 and 6). Thus, predictive location information generated by controller 44 can be transmitted to second transport vehicle 20B over a large distance to provide second transport vehicle 20B with macro-instructions for reaching a hook-up location for the paving train. Once at or in the vicinity of the hook-up location, cold planer 10 can provide locating instructions directly to second transport vehicle 20B, e.g., without the aid of a long-distance communication device. For example, the visual indicia can be directly communicated to an operator of second transport vehicle 20B with micro-instructions for exact placement of second transport vehicle 20B relative to conveyor 48 (FIG. 5).

FIG. 6 is a schematic illustration of a display screen 77 of user interface device 79 (FIG. 4) for second transport vehicle 20B. Display screen 77 can additionally be used in first transport vehicle 20A. Display screen 77 can provide location and guidance indicia for directing empty transport vehicle 20B to a paving train hook-up location. Display screen 77 can provide macro-guidance to transport vehicle 20B for arriving at a predicted hook-up location for a paving train. Once at the predicted hook-up location, local or micro-guidance information can be provided to transport vehicle 20B to bring transport vehicle 20B into actual engagement with the paving train. Display screen 77 can include any one or more of map indicia 200, location indicia 202, instructions indicia 204 and estimate indicia 206.

Map indicia 200 can comprise a roadmap having representations of streets, buildings and geographic information, such as terrain features and bodies of water. Map indicia 200 can include vehicle icon 210, which can represent the location of the vehicle in which display screen 77 is being used, such as second transport vehicle 20B. Vehicle icon 210 can move on map indicia 200 in real-time as second transport vehicle 20B moves in the real world such as by using information from locating device 75. Map indicia 200 can additionally include paving train indicator 212, which can provide the location of cold planer 10, such as by using information from locating device 62. Thus, the location of paving train indicator 212 can move on map indicia 200 as cold planer 10 moves in the real world. Map indicia 200 can include hook-up location indicator 214, which can provide the location for where second transport vehicle 20B is to be moved. Hook-up location indicator 214 can represent the location where a paving train is expected to be when output of cold planer 10 brings the load of first transport vehicle 20A to capacity, e.g., when a threshold productivity value is reached. Thus, hook-up location indicator 214 can comprise a predicted location as described herein. The location of hook-up location indicator 214 can be stationary based on current estimates of where first transport vehicle 20A is expected to be full, which coincides with the destination for empty second transport vehicle 20B. However, hook-up location indicator 214 can move periodically or in real-time as data from cold planer 10 and first transport vehicle 20A is updated, such as due to revised routes, stoppages in work due to maintenance and changed milling conditions, such as changes in milling depth or changes in rate of travel due to different conditions from weather or material. Map indicia 200 can include route information 216, which can provide visual instructions for second transport vehicle 20B to follow to arrive at hook-up location indicator 214 (or the real-world location represented by indicator 214). In examples, as hook-up location indicator 214 moves based on revisions of the estimate determined by controller 44, route information 216 can be updated accordingly to re-route second transport vehicle 20B to the new location. For example, if the milling depth increases such that transport vehicle will become full sooner, hook-up location indicator 214 can move closer to paving train indicator 212. In additional examples, the route for the paving train as taken from a work plan can be plotted on map indicia 200 between paving train indicator 212 and hook-up location indicator 214. In the illustrated example, the paving train route comprises a straight line along a highway.

Location indicia 202 can comprise information that relates to a specific destination for second transport vehicle 20B. Location indicia 202 can comprise geographic coordinates, such as latitude and longitude coordinates, as illustrated. In additional examples, location indicia 202 can comprise a street address. Location indicia 202 can comprise a description, e.g., geolocation, of the location of hook-up location indicator 214.

Instructions indicia 204 can provide routing instructions to an operator of second transport vehicle 20B. Instructions indicia 204 can comprise street by street and turn by-turn driving instructions that an operator of second transport vehicle 20B can manually follow or execute. In additional examples, the driving instructions provided by instructions indicia 204 can be executed by an autonomous driving controller of second transport vehicle 20B. Instructions indicia 204 can comprise textual and numerical information, such as letters, script and the like. In some embodiments, a suitable interface can convert the textual and numerical information to spoken words so that the operator can remain fully-aware of their surroundings. Instructions indicia 204 can provide the route between a dump site and hook-up location indicator 214, or the real-world location of hook-up location indicator 214.

Estimate indicia 206 can comprise visual information indicative of the remaining time before first transport vehicle 20A is full and the remaining distance before first transport vehicle 20A will arrive at the location of hook-up indicator 214. In additional examples, estimate indicia 206 can provide the estimated time and distance for second transport vehicle 20B to reach the location of hook-up indicator 214. As such, the operator of transport vehicle 20B can verify that transport vehicle 20B can arrive at the location of hook-up indicator 214 when needed, e.g., just before the paving train arrives.

Hook-up location indicator 214, location indicia 202, instructions indicia 204 and estimate indicia 206 can be updated correspondingly as information, e.g., sensor data, from cold planer 10 and first transport vehicle 20A is updated and revised based on real-time data and due to expected and unexpected delays in the paving train.

INDUSTRIAL APPLICABILITY

The present disclosure describes various devices, systems and methods for determining performance of a milling machine, estimating output, location and time information based on the performance of the milling machine and generating, providing to and executing driving instructions for an empty transport vehicle to meet the milling machine at a location where an in-use transport vehicle hooked-up or engaged with the milling machine will become full.

Figure 7:
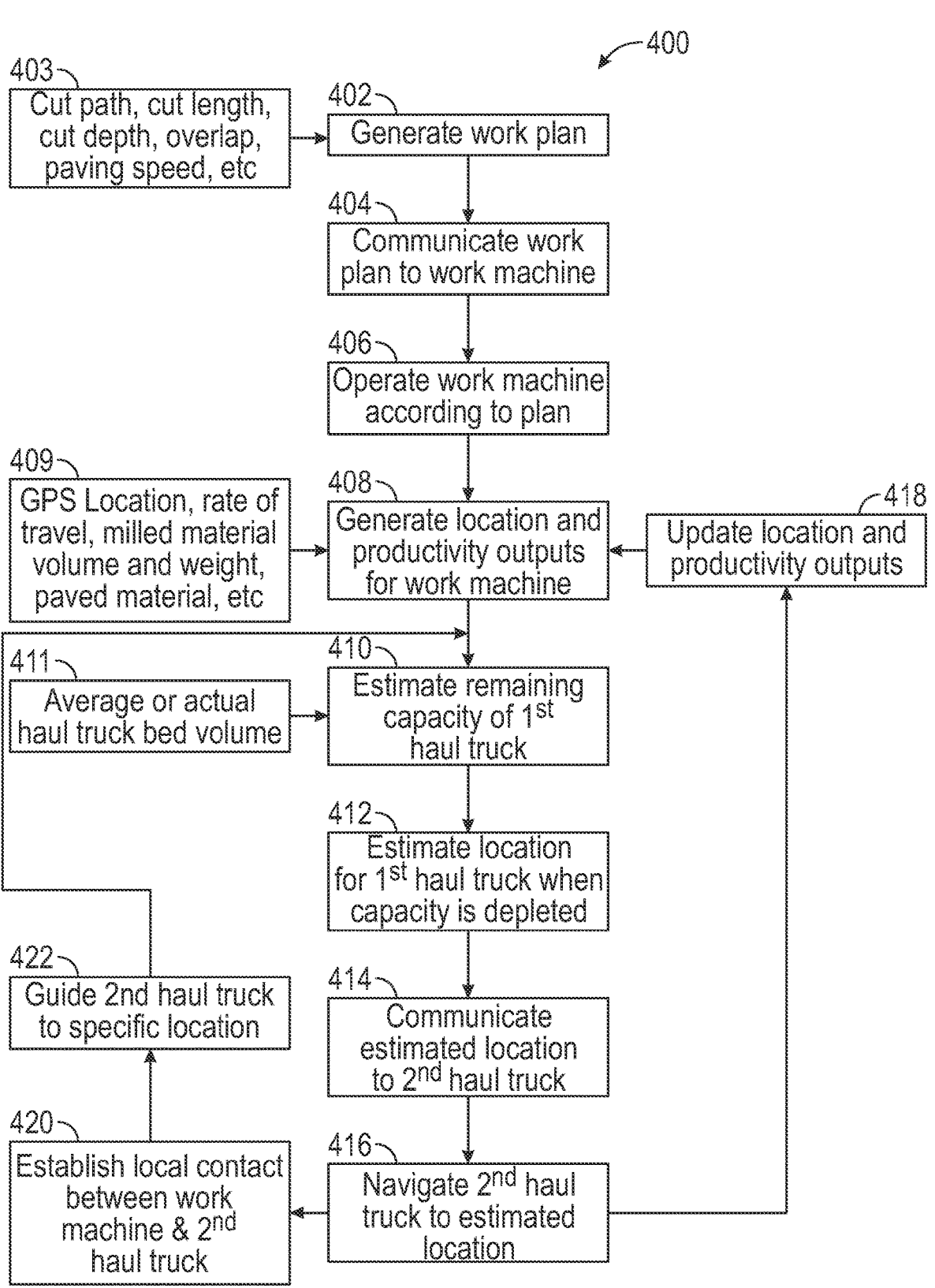
FIG. 7 is a flowchart showing various operations for coordinating positioning between paving train machines and transport vehicles, including providing locating instructions for an engaged transport vehicle and predictive location information to a queued transport vehicle.

FIG. 7 is a flowchart illustrating method 400 including various operations for coordinating positioning between a milling machine and transport vehicles, including providing locating or micro-instructions for an engaged transport vehicle and predictive location information or macro-instructions to a queued transport vehicle.

At operation 402, a work plan for a paving train can be generated. The work plan can include a roadway or other surface area to be re-paved. The work plan can include a milling plan for cold planer 10 and a paving plan for paver 18. The work plan can include turn-by-turn instructions for a paving train in which cold planer 10 and paver 18 are to be used to re-pave a roadway. The work plan can additionally include threshold or capacity information for various types of transport vehicles being used in the work plan. For example, the work plan can include identification numbers that can be recognized with the various controllers described herein, e.g., controller 44 (FIG. 3), such as with a scanner or the like. The identification numbers can include weight and volume capacities for the beds 15 (FIG. 5) of the transport vehicle.

At operation 403, parameters can be entered into the work plan. The work plan can include various parameters for the paving train, such as cut path, cut length, cut depth, overlap between cut paths and the like. The work plan can include the number of transport vehicles desired to maintain proper flow of the paving train between a dump site, an asphalt plant, and the work site.

At operation 404, the work plan can be communicated to a paving train machine. For example, a milling plan can be communicated to cold planer 10 and a paving plan can be communicated to paver 18. The work plan can be communicated wirelessly or directly entered into memory of controllers for the paving train machines.

At operation 406, the paving train machine can be operated according to the work plan. For example, cold planer 10 can be operated to remove old asphalt and deposit the removed pavement in transport vehicle 20A, and paver 18 can deposit asphalt from transport vehicle 16A where cold planer 10 has removed the old asphalt. As the work plan is executed, the various sensors described herein can collect volumetric and weight flow rates of milled material being deposited into transport vehicle 20A.

At operation 408, productivity outputs for the paving train machines can be generated. For example, the volume and weight of old asphalt removed by cold planer 10 can be calculated as discussed herein and the volume and weight of fresh asphalt laid by paver 18 can be calculated as discussed herein. Further the mass flow rate $\dot{m}$ and volume flow rate $\dot{V}$ of milled material can be calculated.

At operation 409, various information can be associated with the productivity outputs, such as geolocations, e.g., latitude and longitude coordinates, rate of travel, e.g., speed, and the like. As such, location, time, volume and weight data can be associated to material productivity values.

At operation 410, the remaining capacity or payload of a transport vehicle can be estimated. For example, the remaining capacity (e.g., the percentage of the weight or volume capacity that has not been used) of first transport vehicle 20A can be estimated and the remaining payload (e.g., the percentage of the weight or volume capacity that is being used) of transport vehicle 16A can be estimated. In examples, the estimated remaining capacity of first transport vehicle 20A can be calculated by comparing the milling rate of cold planer 10 for a period of time to threshold productivity values stored in memory of controller 44, for example. The threshold productivity values can comprise volume capacity and weight capacity for transport vehicle 20A, as well as various other types and varieties of transport vehicles, as can be provided at operation 411. As such, the total volume or weight of material milled by cold planer 10 can be subtracted from the volume or weight capacity. The difference can then be divided by the rate to determine the amount of time remaining before the capacity is reached. In additional examples, the actual departure of an in-use transport vehicle can be used to determine the location for where a new transport vehicle is desired to be located. For example, if in-use transport vehicle 16A departs paver 18 before being completely empty (e.g., to 0% capacity) of paving material, the location for where full transport vehicle 16B is needed can be changed to the location where transport vehicle 16A departed rather than being where it was expected that transport vehicle 16A would be empty. In another example, if in-use transport vehicle 20A departs milling machine 10 before being completely full (e.g., to 100% capacity) of milled material, the location for where empty transport vehicle 20B is needed can be changed to the location where transport vehicle 20A departed rather than being where it was expected that transport vehicle 20A would be full. Thereafter, at operation 412, the remaining time can be multiplied by the rate of travel or speed of the paving train to estimate a location for the paving train when the capacity has been reached. In additional examples, historical data from the paving train can be used to determine the capacity or payload of various transport vehicles. For example, if the paving train has been steadily operating, output data can be used to assume steady operation in the future. In particular, historical data may include the average time and/or distance travelled by the milling machine at normalized operating parameters (e.g., cut depth, propel speed) between a transport vehicle's arrival and departure. The average time and/or distance can then be adjusted in accordance with the variance of the current and historical milling machine operating parameters away from the normalized parameters. This historical estimation may be particularly advantageous where volumetric and/or mass flow rates are not available. In some embodiments, the average time and/or distance may be stored in memory for specific transport vehicle under its identification number and then recalled when the controller receives the transport vehicle's identification number. For example, the unexpected arrival of a transport vehicle (e.g., out of order or rank in the queue) may trigger an update of all of the predicted positions for the rest of the transport vehicles in the queue due to the arrived transport vehicle's recognized capacity. In this way, the real-time information adjusts the estimation based on historical data. Such an estimation can provide a general indication for where new transport vehicles are need and can be refined by real-time information, such as expected or unexpected delays in the paving train due to maintenance and other factors. The estimated or predicted locations for where transport vehicles will be needed ahead or out front of a paving train can be calculated using other sensor data described herein.

At operation 414, the estimated location for when the threshold productivity value or capacity has been reached can be communicated to another transport vehicle. For example, an empty transport vehicle, e.g., second transport vehicle 20B, can receive the location for when it is estimated that an in-use transport vehicle, e.g., first transport vehicle 20A, will be filled with removed asphalt from cold planer 10, and a full transport vehicle can receive the location for when it is estimated that an in-use transport vehicle, e.g., transport vehicle 16A, will be finished emptying fresh asphalt into paver 18.

At operation 416, a second transport vehicle can be navigated to the estimated location for when the capacity of the in-use transport vehicle has been reached. For example, an empty transport vehicle, e.g., second transport vehicle 20B, can receive the estimated location and can be navigated via autonomous operation or via operator input to the location where it is estimated that an in-use transport vehicle, e.g., first transport vehicle 20A, will become full, and a full transport vehicle can receive the estimated location and can be navigated via autonomous operation or via operator input to the location where it is estimated that an in-use transport vehicle, e.g., transport vehicle 16A, will be finished emptying fresh asphalt into paver 18.

At operation 418, the estimated location for when the capacity of the in-use transport vehicle will be reached can be updated based on real-time data collected from the paving train machine. As such, operations 408-416 can be repeated. The estimated locations can be updated based on expected and unexpected, e.g., planned and unplanned, changes in a work plan. For example, though a paving train may operate on a routine or rhythmic pattern where new transport vehicles are needed at regular intervals, operators of transport vehicle may not know when planned breaks or maintenance of the paving train are scheduled. Likewise, operators of transport vehicle may not know when unexpected break-downs or stoppages of the paving train occur. Thus, the estimated location for the new transport vehicles can be revised based on real-time data.

At operation 420, local contact between the paving train machine and the second transport vehicle can be established. In examples, the local contact can comprise visual contact.

At operation 422, the second transport vehicle can be guided into operational engagement with the paving train machine by instructions generated from the paving train machine. In examples, the instructions generated by the paving train machine can comprise projected laser instructions or visual signage for the transport vehicle to move into an exact location to hook-up or engage, e.g., align with a conveyor system for a milling machine, as is described with reference to FIG. 5.

With the present disclosure, transport vehicle for paving trains can be routed to predicted locations where they will be needed, which can then be adjusted in real-time to pinpoint the location where the transport vehicles can navigate to. Thus, guessing and manual adjustment assessments of where to move a transport vehicle by an operator can be eliminated or reduced. The guidance information and the operations executed by transport vehicles according to such guidance information can reduce fuel consumption, reduce work site congestion, reduce the number of transport vehicle needed for a work plan and the like, which can improve the overall efficiency of a paving operation, thereby reducing time and cost.

Figure 8:
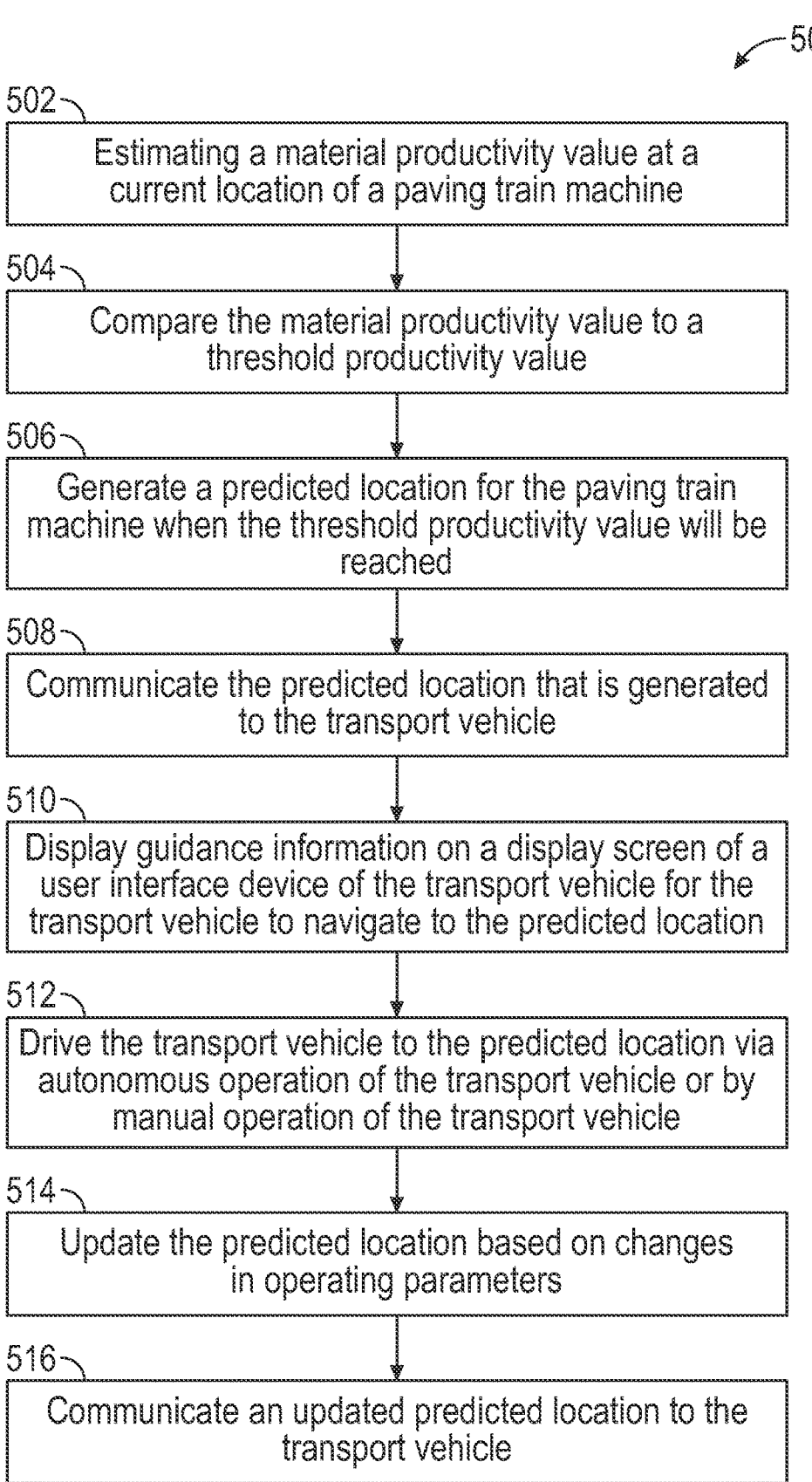
FIG. 8 is a flow chart showing various steps in a method for directing a transport vehicle based on real-time operating parameters of a paving train machine in a paving train.

FIG. 8 is a flow chart showing various steps in a method 500 for directing a transport vehicle based on real-time operating parameters of a paving train machine in a paving train. At operation 502, the step of estimating a material productivity value at a current location of the paving train machine can be performed. At operation 504, the step of comparing the material productivity value to a threshold productivity value can be performed. At operation 506, the step of generating a predicted location for the paving train machine when the threshold productivity value will be reached can be performed. At operation 508, the step of communicating the predicted location that is generated to the transport vehicle can be performed. At operation 510, the step of displaying guidance information on a display screen of a user interface device of the transport vehicle for the transport vehicle to navigate to the predicted location can be performed. At operation 512, the step of driving the transport vehicle to the predicted location via autonomous operation of the transport vehicle or by manual operation of the transport vehicle can be performed. At operation 514, the step of updating the predicted location based on changes in operating parameters can be performed. At operation 516, the step of communicating an updated predicted location to the transport vehicle can be performed.

In a first example, a method for directing a transport vehicle (16, 20A, 20B) based on real-time operating parameters of a paving train machine (10, 18) in a paving train can comprise estimating a material productivity value at a current location of the paving train machine (408), comparing the material productivity value to a threshold productivity value (410), generating a predicted location for the paving train machine when the threshold productivity value will be reached (412), and communicating the predicted location that is generated to the transport vehicle (414).

In a second example, the first example can further comprise displaying guidance information (200, 202, 204, 206) on a display screen (77) of a user interface device (79) of the transport vehicle for the transport vehicle to navigate to the predicted location.

In a third example, the second example can include the guidance information comprising displaying the predicted location for the paving train machine (214) on a map (200) in the display screen; and displaying a current location for the transport vehicle (210) on the map; further comprising: comparing the current location of the transport vehicle to the predicted location; and displaying driving instructions (216) for routing the transport vehicle from the current location to the predicted location.

In a fourth example, the second example can additionally include the guidance information comprising one or more of an amount of time (206) until the threshold productivity value is reached; a distance (206) until the paving train machine reaches the predicted location; and location data (202) for the predicted location, the location data comprising at least one of an address for the predicted location or geographic coordinates for the predicted location.

In a fifth example, the first example can additionally include updating the predicted location based on planned changes in operating parameters (418); and communicating an updated predicted location to the transport vehicle; wherein the planned changes in operating parameters comprise a change in cut depth (D) of the paving train machine.

In a sixth example, the example of claim 1 can additionally include updating the predicted location based on unplanned changes in a work plan (418); and communicating an updated predicted location to the transport vehicle; wherein the unplanned changes to the work plan comprise changing of cutting bits or filling a water tank on the paving train machine.

In a seventh example, the first example can additionally include updating the predicted location based on departure or arrival of an in-use transport vehicle; and communicating an updated predicted location to the transport vehicle; wherein the in-use transport vehicle departs or arrives before capacity is reached.

In an eight example, the first example can additionally include estimating the material productivity value at the current location of the paving train machine by estimating a milling rate for a milling machine, the milling rate comprising an amount of milled material correlated to speed of the paving train; wherein the amount of milled material comprises volume or weight and the speed of the paving train comprises distance and time.

In a ninth example, a system for coordinating location of an empty transport vehicle (16, 20A, 20B) in a paving train operation comprises a sensor (59, 60, 60a, 60b, 60c, 62, 64) configured to generate material productivity data for a paving train machine (10, 18); a controller (44, 72) for the paving train machine, the controller being configured to determine: an output rate of the paving train machine from the material productivity data; a time when an in-use transport vehicle will be at capacity based on the output rate; a location for where the in-use transport vehicle will be at capacity based on the time; updating the location based on at least one of a planned change in an operating parameter of the paving train machine or an unplanned change to a work plan; and a communication device (66, 70) for the paving train machine configured to transmit the location to the empty transport vehicle.

In a tenth example, the ninth example can further comprise a communication device (71) for the empty transport vehicle to receive the location; a guidance device (79) for the empty transport vehicle configured to generate macro-guidance information for the empty transport vehicle to arrive at the location; and a projector (116) connected to the paving train machine configured to generate micro-guidance information for the empty transport vehicle that can be emitted from the paving train machine.

Unless explicitly excluded, the use of the singular to describe a component, structure, or operation does not exclude the use of plural such as components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A method for directing a transport vehicle based on real-time operating parameters of a paving train machine in a paving train, the method comprising:
   estimating a material productivity value at a current location of the paving train machine;
   comparing the material productivity value to a threshold productivity value;
   generating a predicted location for the paving train machine when the threshold productivity value will be reached;
   communicating the predicted location that is generated to the transport vehicle; and
   projecting guidance lines for the transport vehicle from the paving train machine when the transport vehicle is sufficiently close to the paving train machine to visually direct the transport vehicle to the predicted location.

2. The method of claim 1, further comprising displaying guidance information on a display screen of a user interface device of the transport vehicle for the transport vehicle to navigate to the predicted location.

3. The method of claim 2, wherein the guidance information comprises:
   displaying the predicted location for the paving train machine on a map in the display screen; and
   displaying a current location for the transport vehicle on the map.

4. The method of claim 3, further comprising:
   comparing the current location of the transport vehicle to the predicted location; and
   displaying driving instructions for routing the transport vehicle from the current location to the predicted location.

5. The method of claim 3, wherein the guidance information further comprises:
   an amount of time until the threshold productivity value is reached; and
   a distance until the paving train machine reaches the predicted location.

6. The method of claim 2, wherein the guidance information comprises location data for the predicted location, the location data comprising at least one of an address for the predicted location or geographic coordinates for the predicted location.

7. The method of claim 1, further comprising driving the transport vehicle to the predicted location via autonomous operation of the transport vehicle or by manual operation of the transport vehicle.

8. The method of claim 1, further comprising:

updating the predicted location based on planned changes in operating parameters; and communicating an updated predicted location to the transport vehicle.

9. The method of claim 8, wherein the planned changes in operating parameters comprise a change in cut depth of the paving train machine.

10. The method of claim 1, further comprising:

updating a time for the predicted location based on unplanned changes in a work plan; and communicating an updated predicted location to the transport vehicle; wherein the unplanned changes to the work plan comprise at least one of changing of cutting bits and filling a water tank on the paving train machine.

11. The method of claim 10, further comprising:

updating the predicted location based on departure or arrival of an in-use transport vehicle; and communicating an updated predicted location to the transport vehicle;

wherein the in-use transport vehicle departs or arrives before capacity is reached.

12. The method of claim 1, wherein estimating the material productivity value at the current location of the paving train machine comprises:

estimating a milling rate for a milling machine, the milling rate comprising an amount of milled material correlated to a speed of the paving train;

wherein the amount of milled material comprises a volume or a weight and the speed of the paving train comprises a distance and a time.

13. The method of claim 12, wherein the milling rate of the milling machine comprises the volume of milled material and the threshold productivity value comprises a volumetric storage capacity of the transport vehicle.

14. The method of claim 12, wherein the milling rate of the milling machine comprises the weight of milled material and the threshold productivity value comprises a weight capacity of the transport vehicle.

15. The method of claim 1, wherein estimating the material productivity value at the current location of the paving train machine comprises:

estimating a paving rate for a paver, the paving rate comprising an amount of paved material correlated to a speed of the paving train.

16. A method for directing a transport vehicle based on real-time operating parameters of a paving train machine in a paving train, the method comprising:

estimating a material productivity value at a current location of the paving train machine;

comparing the material productivity value to a threshold productivity value;

generating a predicted location for the paving train machine when the threshold productivity value will be reached;

communicating the predicted location that is generated to the transport vehicle; and driving the transport vehicle to the predicted location via autonomous operation of the transport vehicle or by manual operation of the transport vehicle.

* * * * *